United States Patent
Feustel et al.

(10) Patent No.: US 11,981,876 B2
(45) Date of Patent: May 14, 2024

(54) WAX INHIBITORS WITH IMPROVED FLOWABILITY

(71) Applicant: Clariant International Ltd., Muttenz (CH)

(72) Inventors: Michael Feustel, Köngernheim (DE); Matthias Krull, Harxheim (DE)

(73) Assignee: Clariant International Ltd, Muttenz (CH)

( * ) Notice: Subject to any disclaimer, the term of this patent is extended or adjusted under 35 U.S.C. 154(b) by 68 days.

(21) Appl. No.: 17/630,710

(22) PCT Filed: Jun. 18, 2020

(86) PCT No.: PCT/EP2020/066851
§ 371 (c)(1),
(2) Date: Jan. 27, 2022

(87) PCT Pub. No.: WO2021/018467
PCT Pub. Date: Feb. 4, 2021

(65) Prior Publication Data
US 2022/0315850 A1  Oct. 6, 2022

(30) Foreign Application Priority Data
Jul. 29, 2019 (EP) .................... 19188740

(51) Int. Cl.
*C10L 10/16* (2006.01)
*C09K 8/524* (2006.01)
*C10L 1/14* (2006.01)
*C10L 1/188* (2006.01)

(52) U.S. Cl.
CPC .............. *C10L 1/143* (2013.01); *C09K 8/524* (2013.01); *C10L 1/1885* (2013.01); *C10L 1/1886* (2013.01); *C10L 10/16* (2013.01); *C10L 2200/0438* (2013.01); *C10L 2300/20* (2013.01)

(58) Field of Classification Search
CPC .. C09K 8/524; C10L 10/16; C10L 2200/0438
See application file for complete search history.

(56) References Cited

U.S. PATENT DOCUMENTS

| 3,169,980 A | 2/1965 | Benoit, Jr. |
| 2001/0056164 A1* | 12/2001 | Duncum .................. C10L 1/328 526/318.4 |
| 2002/0166995 A1 | 11/2002 | Robinson |
| 2007/0051033 A1* | 3/2007 | Martin .................... C10L 10/04 44/342 |
| 2013/0023453 A1 | 1/2013 | Feustel |

FOREIGN PATENT DOCUMENTS

| EP | 0326356 | 8/1989 |
| EP | 0400874 | 12/1990 |
| WO | 9833846 | 8/1998 |
| WO | 2004037953 | 5/2004 |
| WO | 2013123160 | 8/2013 |
| WO | 2014071041 | 5/2014 |

OTHER PUBLICATIONS

International Search Report issued in App. No. PCT/EP2020/066851, dated Oct. 5, 2020, 3 pages.
Prof. Dr. Jurgen Falbe et al., Römpp Chemie Lexikon, 9. Auflage, Phenolharze, (1988-1992) Band 4 pp. 3351-3354 ff, 6 pages.
Ullmann's Encyclopädie of Industrial Chemistry, Polyolefins, vol. A21, pp. 505-513, 16 pages, 1992.

* cited by examiner

*Primary Examiner* — Ellen M McAvoy
*Assistant Examiner* — Ming Cheung Po

(57) ABSTRACT

This invention provides a wax inhibitor composition comprising
A) the reaction product obtainable by reaction of
  i) a carboxylic acid containing an optionally substituted cycloaliphatic hydrocarbyl residue with
  ii) an alkylene polyamine,
B) a polymeric wax inhibitor, and
C) an organic solvent.

29 Claims, No Drawings

WAX INHIBITORS WITH IMPROVED FLOWABILITY

The present invention provides wax inhibitors that allow for an improved handling at low temperatures, and for the use thereof as cold flow improver, pour point depressant, viscosity reducer, and the like for improving the properties of paraffin-containing hydrocarbon fluids.

Crude oils and the distillates and distillation residues produced therefrom, are complex mixtures of different kinds of substances, for example saturated and unsaturated hydrocarbons, aromatics, resins and asphaltenes. Some of them may present problems during production, transport, storage and/or further processing.

In particular, long-chain n-paraffins having at least 18 carbon atoms tend to crystallize and to form waxy solids when the oil cools down. The solubility of these components in for example crude oil is strongly temperature-dependent. They are usually soluble in the crude oil under down-hole conditions i.e. high pressure and high temperature. However, as the oil is brought to the surface, its temperature and pressure are reduced. When the temperature goes below the oil-specific wax appearance temperature the wax begins to crystallize in the form of thin plates, flakes and/or fine needles. Upon further cooling, the plates, flakes and/or needles turn into a three-dimensional network in which relatively large amounts of liquid constituents are intercalated and retained. Accordingly, the oil loses its flowability even though most of the oil is still liquid. As a consequence, transport in pipelines and other production equipment may cease and in storage tanks considerable amounts of oil may be trapped between the paraffins that crystallize out especially at the tank walls. This phenomenon is often referred to as gelling. Gelling is not restricted to crude oils but also the heavier products produced therefrom, for example middle distillates, heavy heating oil, marine diesel, bunker oil and residual oils, which contain greater amounts of n-paraffins suffer from it.

Flow problems caused by gelling of oils can be reduced in a number of ways, including heating the lines and/or storage tanks, diluting the oil with solvent or by addition of so-called "wax inhibitors". Wax inhibitors prevent gelling of the oil by modifying the crystal structure of the paraffins that precipitate out during cooling. In some cases, these additives promote the formation of a vast number of fine paraffin crystals which are too small to form a gel; partly they interfere with further wax crystal growth and prevent the formation of larger plates and/or flakes. By both mechanisms the formation of a three-dimensional network of paraffin crystals ("wax") can be delayed or even prevented. Since additives of this kind usually lower the pour point of the oil, they are also referred to as pour point depressants (PPDs). The pour point refers to the lowest temperature at which a sample of an oil still just flows in the course of cooling. The pour point of oils can be determined, for example, by means of DIN ISO 3016, ASTM D5853 or ASTM D97.

Most customary wax inhibitors are oil-soluble, synthetic polymeric compounds, for example copolymers of ethylene with vinyl esters and/or alkyl (meth)acrylates, poly(alkyl (meth)acrylates), ethylene copolymers grafted with alkyl (meth)acrylates, esterified, amidated and/or imidized maleic acid-olefin-copolymers, and alkyl phenol-aldehyde resins.

However, wax inhibitor technology based on synthetic polymeric compounds suffers from the drawback that the solvent free polymers are solids or at least highly viscous liquids at ambient. The solvent-free polymers usually have melting points above 40° C. and often even above 60° C. Thus, transport of the wax inhibitor from tanks, whether stationary or on trucks, after storage or transport, and pumping of the wax inhibitor to the locus of treatment requires precautionary measures as for example heating and/or dilution with a solvent. Accordingly, most customary wax inhibitors are applied as highly diluted formulations with active concentrations usually below 50 wt.-% and often between 3 and 30 wt.-%. As the customary polymeric pour point depressants are typically oil soluble, their formulations in organic, predominantly aromatic solvents such as toluene, xylene or xylene bottoms are the preferred choice. Nevertheless, many of the pour point depressants and wax inhibitors that are presently available in the market solidify at temperatures ranging from 5° C. to 35° C. making such systems not particularly useful in the field at cold temperatures or under winter conditions. Alternatively, also dispersions of pour point depressants in water and/or other polar solvents having poor solubility for the pour point depressant have been proposed. Of course, highly diluted formulations in turn raise other disadvantages, including costs for the solvent, storage capacity, transportation and application of large volumes.

A further approach to paraffin inhibition respectively pour point depression in mineral oils is the use of specific surfactants. These predominantly monomeric additives have a long chain hydrocarbyl group which has the ability to absorb to or co-crystallize with the paraffins and a polar group which prevents attachment of further paraffins to the once formed crystal.

U.S. Pat. No. 3,169,980 discloses polyamides formed from a polyalkylene polyamine and a mixture of fatty acids comprising predominantly branched-chain fatty acids having 12 to 30 carbon atoms each, and wherein the polyamides contain 1 to 3 amine groups in addition to the amide groups. The polyamides are useful as pour point depressants for base oils of lubricating viscosity and in hydrocarbon-based fuels.

However, the amounts of such polyamides required for efficient pour point reduction are high and thus make this method commercially unattractive, especially for the treatment of commodities like crude oil. In a further approach, reaction products of fatty acids with polyamines have been used in combination with conventional polymeric wax inhibitors. In some cases, synergistic effects on the pour point of the treated crudes have been reported.

EP 0326356 shows a further reduction of CFPP and pour point of fuel oils when the oleic acid salt of oleylimidazoline is used in addition to a crosslinked ester compound and a polymeric flow improver.

WO 98/33846 discloses dispersions of ester polymers (e.g. poly(alkyl acrylates)) for reducing the wax formation or deposition in a wax containing oil wherein the ester polymer is present as solid particles or in the form of droplets of a solution or suspension of the ester polymer in a first liquid, dispersed as an emulsion in a second liquid. The dispersions may also comprise a monomeric additive with a long chain hydrocarbyl group having at least 10 carbons and a polar group. The polar group may contain one or more nitrogen atoms, e.g. in a primary, secondary or tertiary amine or amide group. This may be a polyamine having a long chain hydrocarbyl group directly attached to one nitrogen atom, an amidoamine as for example N-tallowyl-1,3-propylene diamine or a long chain aliphatic hydrocarbyl N-heterocyclic compound as for example N-2-aminoethyl-2-oleyl-imidazoline.

WO 2004/037953 discloses reaction products of fatty acids and hydroxyalkylamines respectively aminoalkylamines to further improve the cold flow properties of fuel oils containing an EVA copolymer.

US 2007/0051033 discloses a method of reducing pour point and/or inhibiting or retarding the formation of paraffin deposits in liquid hydrocarbons, such as crude oil and petroleum fuel, using imidazolines. It also discloses a method of increasing the effectiveness of a non-imidazoline paraffin inhibitor as for example an acrylate copolymer, an alkyl acrylate vinylpyridine copolymer, an ethylene vinyl acetate copolymer, a maleic anhydride ester copolymer, a branched polyethylene, naphthalene, anthracene, microcrystalline wax and/or asphaltene by adding to it an imidazoline. The combination of imidazoline and non-imidazoline paraffin inhibitor exhibits a synergistic pour point depression in the oil. The imidazolines may be prepared by reaction of a polyamine with a fatty acid.

WO 2013/123160 discloses lubricant formulations containing esterified copolymers having a backbone comprising units derived from an α-olefin monomer and an ethylenically unsaturated carboxylic acid or a derivative thereof. The formulations may further comprise a corrosion inhibitor such as a condensation product of a fatty acid and a polyamine and/or a pour point depressant.

WO 2014/071041 discloses a process for reducing the viscosity of heavy residual hydrocarbons comprising admixing the heavy residual hydrocarbons with an additive comprising: a first component selected from the group consisting of optionally alkoxylated alkyl phenol-aldehyde (amine) resins, α-olefin-maleic anhydride co-polymers, and grafted polymers including half ester/amide and full ester/amide derivatives; and a second component which is a synergist and selected from the group consisting of polyamines, amidoamines, imidazolines, and combinations thereof. When the synergist is an amidoamine, it may be a tall oil fatty acid amide and a polyamine; when the synergist is an imidazoline, it may be prepared using a tall oil fatty acid-amidoamine and a polyamine. The only exemplified embodiment is a combination of an alkoxylated phenol resin and an imidazoline.

However, there is a constant strive for more efficient means for reducing the pour point of paraffin-containing hydrocarbon fluids as well as for inhibiting or retarding paraffin deposits therein. This includes additives allowing for a stronger reduction of pour point, additives inhibiting and/or retarding the formation of paraffin deposits more efficiently, additives giving the same performance at a lower dosage rate, additives which can be applied (pumped) at a lower temperature, and/or additives which are suited for the treatment of a broader variety of different hydrocarbon fluids. Especially problematic hydrocarbon fluids to be treated are heavy and extra heavy crude oils and especially those containing a high amount of paraffins as for example more than 40% and especially more than 50% of paraffins, and those containing a high amount of paraffins and asphaltenes as for example a combined amount of paraffins and asphaltenes of more than 65% and especially more than 70%, the content of paraffins (saturates) and asphaltenes being determined according to SARA analysis. Additionally, there remains a desire for wax inhibitors having an improved handleability. This may be indicated for example by a reduced pour point of the additive containing the same concentration of polymeric active, or by a lower viscosity of the additive containing the same concentration of polymeric active at a given temperature, or, vice versa, by a higher active content of the additive showing the same pour point and/or viscosity. Both options are desirable as they ease logistics including less storage capacity and cost for transportation.

Accordingly, there is a need for concentrated wax inhibitors being pumpable and preferably being pourable at low temperatures as for example at ambient temperature without the need for heating. Preferably such concentrated wax inhibitors should be pumpable for example below 25° C., more preferably below 20° C., still more preferably below 15° C. and in extreme cases even below 10° C. or even below 0° C. while having a high active content. Likewise, such additives should dissolve properly in the paraffin-containing hydrocarbon fluid to be treated at those low temperatures. Similarly, wax inhibitors allowing for a stronger depression of pour point are sought.

Surprisingly it has been found that a composition comprising a polymeric wax inhibitor and a minor amount of a co-additive which is the reaction product of a carboxylic acid containing a cycloaliphatic structural unit with a polyamine solves many of the given problems. In such formulation the pour point and the viscosity of the polymeric wax inhibitor are reduced in comparison to a composition not comprising the co-additive and thereby it's handleability at low temperatures is improved. In additives containing two or more polymeric wax inhibitors with limited compatibility, the addition of the co-additive improves polymer compatibility and gives rise to transparent formulations having a reduced viscosity. Furthermore, the presence of the co-additive facilitates the dissolution of the polymeric wax inhibitor in the paraffin-containing hydrocarbon fluid significantly. Additionally, the presence of the co-additive in such composition synergistically improves the performance of the polymeric wax inhibitor in paraffin-containing hydrocarbon fluids and especially in mineral oils as for example in crude oils and in mineral oil derived liquids.

In a first aspect the invention thus provides a wax inhibitor composition comprising
  A) the reaction product obtainable by reaction of
    i) a carboxylic acid containing an optionally substituted cycloaliphatic hydrocarbyl residue with
    ii) an alkylene polyamine,
  B) a polymeric wax inhibitor, and
  C) an organic solvent.

In a second aspect the invention provides the use of a reaction product (A) obtainable by reaction of a carboxylic acid containing an optionally substituted cycloaliphatic hydrocarbyl residue (i) with an alkylene polyamine (ii) to reduce the pour point and/or the viscosity of a polymeric wax inhibitor (B), wherein (A) and/or (B) are dissolved or dispersed in an organic solvent (C).

In a third aspect the invention provides a method to reduce the viscosity of a polymeric wax inhibitor (B) comprising the mixing of the polymeric wax inhibitor (B) with the reaction product (A) obtainable by reaction of a carboxylic acid containing an optionally substituted cycloaliphatic hydrocarbyl residue (i) with an alkylene polyamine (ii), wherein (A) and/or (B) are dissolved or dispersed in an organic solvent (C).

In a fourth aspect the invention provides the use of a reaction product (A) obtainable by reaction of a carboxylic acid containing an optionally substituted cycloaliphatic hydrocarbyl residue (i) with an alkylene polyamine (ii) to improve the dissolution of a polymeric wax inhibitor (B) in a paraffin-containing hydrocarbon fluid, wherein (A) and/or (B) are dissolved or dispersed in an organic solvent (C).

In a fifth aspect the invention provides a method for further improving the cold flow properties of a mineral oil and/or a mineral oil derived liquid containing a polymeric wax inhibitor (B) wherein the method comprises admixing the reaction product (A) obtainable by reaction of a carboxylic acid having an optionally substituted cycloaliphatic hydrocarbyl residue (ii) with an alkylene polyamine (ii) to the paraffin-containing hydrocarbon fluid containing the polymeric wax inhibitor (B).

In a sixth aspect the invention provides a paraffin-containing hydrocarbon fluid containing
  A) the reaction product obtainable by reaction of
    i) a carboxylic acid containing an optionally substituted cycloaliphatic hydrocarbyl residue with
    ii) an alkylene polyamine, and
  B) a polymeric wax inhibitor.

In a seventh aspect the invention provides the use of a wax inhibitor composition according to the first aspect as a pour point depressant for a paraffin-containing hydrocarbon fluid.

In an eight aspect the invention provides a method for depressing the pour point of a paraffin-containing hydrocarbon fluid by adding the wax inhibitor composition according to the first aspect of the invention to paraffin-containing hydrocarbon fluid.

Further improvement of the cold flow properties means that the pour point of the paraffin-containing hydrocarbon fluid containing (A) and (B) is lower than the pour point of the paraffin-containing hydrocarbon fluid containing the same amount of (B) only. In the following, the reaction product obtainable by reaction of a carboxylic acid (i) containing an optionally substituted cycloaliphatic hydrocarbyl residue with an alkylene polyamine (ii) is also referred to as co-additive (A).

Co-Additive (A)

Preferred reaction products obtainable by the reaction of a carboxylic acid containing an optionally substituted cycloaliphatic hydrocarbyl residue (i) with an alkylene polyamine (ii) include amidoamines, imidazolines and their mixtures.

In a first preferred embodiment the reaction product (A) of a carboxylic acid containing an optionally substituted cycloaliphatic hydrocarbyl residue (i) and an alkylene polyamine (ii) is an amidoamine of the general formula (1)

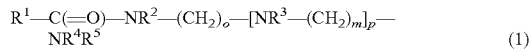

$$R^1-C(=O)-NR^2-(CH_2)_o-[NR^3-(CH_2)_m]_p-NR^4R^5 \quad (1)$$

wherein
  $R^1$ is an optionally substituted hydrocarbyl residue having 5 to 70 carbon atoms which contains at least one cycloaliphatic structural unit,
  $R^2$ and $R^3$ are, independently from each other, selected from hydrogen and a hydrocarbyl residue having 1 to 20 carbon atoms,
  $R^4$ is hydrogen or a hydrocarbyl residue having 1 to 20 carbon atoms,
  $R^5$ is independently from $R^4$ selected from hydrogen, an optionally substituted hydrocarbyl residue having 1 to 20 carbon atoms and an acyl group having the structure $-C(=O)-R^1$, with the proviso that $R^4$ and $R^5$ together may form a 5- or 6-membered ring,
  o is an integer from 2 to 5, and preferably 2 or 3,
  m is an integer from 2 to 5, and preferably 2 or 3, and
  p is 0 or an integer from 1 to 10, and preferably an integer from 1 to 3.

In a second preferred embodiment, the reaction product (A) of a carboxylic acid containing an optionally substituted cycloaliphatic hydrocarbyl residue (i) and an alkylene polyamine (ii) corresponds to an imidazoline of the general formula (2):

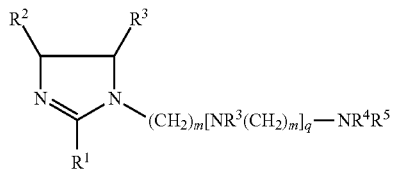

wherein
  $R^1$, $R^2$, $R^3$, $R^4$, $R^5$ and m have the same meaning as given above for general formula (1), and
  q is 0 or an integer between 1 and 9, and preferably 1 or 2.

Reaction products of formulae (1) and (2) can be obtained by reacting a carboxylic acid containing an optionally substituted cycloaliphatic hydrocarbyl residue (i) with an alkylene polyamine (ii). While lower reaction temperatures foster the formation of amidoamines of formula (1) higher temperatures and/or prolonged reaction times foster the formation of cyclic imidazolines of formula (2). In a preferred embodiment co-additive (A) comprises both, amidoamines of formula (1) and imidazolines of formula (2). Preferably the mixing ratio of amidoamines (1) and imidazolines (2) is between 50:1 and 1:20, more preferably between 20:1 and 1:10, more preferably between 10:1 and 1:5 and especially preferred between 5:1 and 1:2 parts by weight of active substance, as for example between 50:1 and 1:10, or between 50:1 and 1:5, or between 50:1 and 1:2, or between 20:1 and 1:20, or between 20:1 and 1.5, or between 20:1 and 1:2, or between 10:1 and 1:20, or between 10:1 and 1:10, or between 10:1 and 1:1, or between 5:1 and 1:20, or between 5:1 and 1:10, or between 5:1 and 1:5 parts by weight of active substance.

Cycloaliphatic Carboxylic Acids (i)

In a preferred embodiment the carboxylic acid (i) used for the preparation of co-additive (A) contains an optionally substituted cycloaliphatic hydrocarbyl residue having from 6 to 70, more preferably from 10 to 50 and especially preferred from 12 to 40 carbon atoms, as for example from 6 to 50, or from 6 to 40, or from 10 to 70, or from 10 to 40, or from 12 to 70 or from 12 to 50 carbon atoms. Preferably the cycloaliphatic structural unit is bound to the carboxyl group either directly via a C—C bond or via a spacer. Preferred spacers are alkylene groups having 1 to 10 and preferably having 1 to 5 carbon atoms.

In a preferred embodiment the carboxylic acid (i) contains a monocyclic structural unit. In a further preferred embodiment the carboxylic acid (i) contains a polycyclic structural unit. Preferred polycyclic structural units contain 2 to 10 rings and more preferred 3 to 6 rings as for example 2 to 6 rings and especially preferred 2 or three rings. When two or more rings are present they are preferably annulated by two commonly owned ring atoms. In a further preferred embodiment, each cyclic hydrocarbyl structural unit is a five- and/or six-membered ring. In a further preferred embodiment, the carboxylic acid (i) contains at least two five- and/or six-membered rings preferably being joined to one another via two vicinal carbon atoms. Preferably, the cycloaliphatic structural units contain at most one heteroatom, for example oxygen or nitrogen, but more preferably all ring atoms are carbon atoms. The cycloaliphatic hydrocarbyl residue of the carboxylic acid may be saturated or unsaturated. Preferably, unsaturated cycloaliphatic hydrocarbyl residues contain one, two or three C=C-double bonds. The double bonds may be in the cyclic structural units or they may be attached to them, however, each ring comprises at most one double bond.

In a preferred embodiment the cycloaliphatic hydrocarbyl residue of the carboxylic acid (i) bears one or more further substituents. Examples for preferred further substituents are alkyl groups having 1 to 10 carbons atoms, alkenyl groups having 2 to 10 carbon atoms, hydroxyl, alkoxy and halogen as for example chlorine, fluoride or bromide. In a specifically preferred embodiment the cycloaliphatic structural unit bears at least one alkyl group having 1 to 10 carbons atoms or an alkenyl group having 2 to 10 carbon atoms.

Preferred carboxylic acids (i) for the preparation of co-additive (A) are naphthenic acids and resin acids. Commercially available mixtures of these acids are especially preferred.

In a first preferred embodiment the carboxylic acid (i) is a naphthenic acid. The term naphthenic acid refers to a group of carboxylic acids present in crude oils which are naphthenes (cycloparaffins) that contain a carboxyl group. They may contain one or more cycloaliphatic structural units. The cycloaliphatic structural unit ("moiety") includes single and multiple cyclopentane and cyclohexane rings. In naphthenic acids containing two or more cyclic moieties these are preferably fused. The carboxyl group may be bound directly to a cycloaliphatic moiety or to an alkyl residue bound to the cycloaliphatic moiety. In a preferred embodiment the carboxyl group is attached to an alkyl side chain rather than directly to a ring. Preferred naphthenic acids are composed predominantly of alkyl-substituted cycloaliphatic carboxylic acids.

Naphthenic acids are described by the general formula $C_nH_{2n+z}O_2$ in which n indicates the carbon number and z is a negative integer that specifies the hydrogen deficiency resulting from ring formation. The absolute value of z divided by 2 gives the number of rings in the specific compound. For example, z is equal to −2 in monocyclic naphthenic acids, equal to −4 in bicyclic naphthenic acids, equal to −6 in tricyclic acids, and equal to −8 in tetracyclic acids. In preferred naphthenic acids n is an integer from 7 to 71, more preferably from 11 to 51 and especially preferred from 13 to 41, as for example from 7 to 51, or from 7 to 41, or from 11 to 71, or from 11 to 41, or from 13 to 71 or from 13 to 51. Preferably z is an integer between −2 and −12 as for example −2, −4, −6, −8, −10 or −12.

Examples for chemical structures of naphthenic acids are provided below, wherein $R^6$ is an alkyl residue having 1 to 20 carbon atoms and s is zero or an integer between 1 and 10 and preferably between 1 and 4. The formulae of the different naphthenic acid compounds are clustered according to ring families, i. e. according to general structures which have a different number of rings (z).

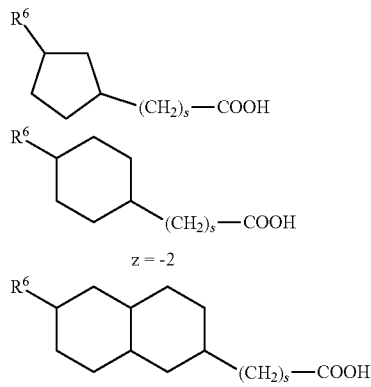

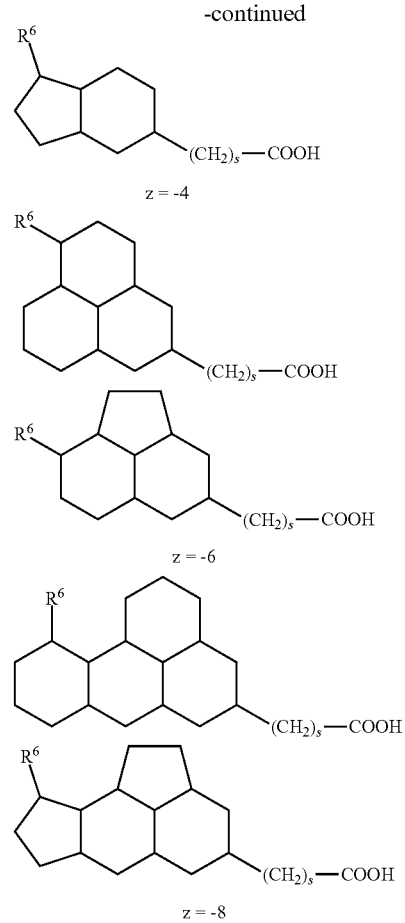

The use of a mixture of two or more individual naphthenic acids has proven to be especially advantageous. The acids may vary for example in carbon number, in ring number and/or stereochemistry. For example, more than one isomer exists for a given z homolog and the molecular weights differ by 2 mass units ($H_2$) between the z-series and by 14 mass units ($CH_2$) between n-series.

In a further preferred embodiment, the naphthenic acids described above are reacted with the alkylene polyamine (ii) in admixture with a minor amount of an acyclic carboxylic acid with the formula $C_nH_{2n+z}O_2$ wherein z is zero. These acyclic compounds are highly branched, unlike fatty acids and often associated with the cyclic naphthenic acids. Preferably the content of acyclic components in a mixture of cyclic and non-cyclic naphthenic acids is below 50 mol-%, more preferably below 30 mol-% and especially preferred below 25 mol-%.

Naphthenic acids can be obtained by extraction from mineral oils as for example from crude petroleum or from distillates thereof such as diesel fuel, jet fuel and kerosene. The main fraction are carboxylic acids with a carbon backbone of 7 to about 30 carbon atoms per molecule and especially between 10 and 22 carbons per molecule, as for example between 7 and 22 carbons per molecule or 9 to about 30 carbons per molecule. The composition of naphthenic acid mixtures extracted from mineral oils may vary; depending on the composition of the crude oil as well as on to the method of extraction. Naphthenic acids isolated from crude oils may for example contain constituents with carbon numbers predominantly in the range of $C_6$ to $C_{16}$ (corresponding to a molecular weight range of approximately 116 to 250) and with a ring distribution of approximately 0 rings (24%), 1 ring (39%), 2 rings (30%), 3 rings (5%) and 4 rings (2%). In another example they may have carbon numbers in the range of 14 to 27 (corresponding to a molecular weight range of 220 to 368) and a ring distribution of 0 rings (20%), 1 ring (23%), 2 rings (20%), 3 rings (20%) and 4 rings (18%).

The mean molecular weight of naphthenic acids and naphthenic acid mixtures preferred for the different aspects of the invention is generally between 120 to well over 700 g/mol, more preferred between 180 and 420 g/mol and especially preferred between 190 and 350 g/mol as for example between 120 and 420 g/mol, or between 120 and 350 g/mol, or between 180 and well over 700 g/mol, or between 180 and 350 g/mol, or between 190 and well over 700 g/mol or between 190 and 420 g/mol.

The acid number of preferred naphthenic acids and naphthenic acid mixtures is preferably in the range of between 80 and 400 mg KOH/g, more preferably in the range of between 120 and 270 mg KOH/g and especially between 140 and 250 mg KOH/g as for example in the range between 80 and 270 mg KOH/g, or 80 and 250 mg KOH/g, or 120 and 400 mg KOH/g or 120 and 250 mg KOH/g or 140 and 400 mg KOH/g, or 140 and 270 mg KOH/g.

In a second preferred embodiment of the invention, the carboxylic acid containing an optionally substituted cycloaliphatic hydrocarbyl residue (i) is an acid based on natural resins. These natural resins are obtainable, for example, by extracting resinous trees, especially resinous conifers, and can be isolated by distillation from these extracts. Among the resin-based acids, preference is given to abietic acid, dihydroabietic acid, tetrahydroabietic acid, dehydroabietic acid, neoabietic acid, pimaric acid, levopimaric acid and palustric acid, and also derivatives thereof. In practice, it has been found to be useful to use mixtures of different polycyclic carboxylic acids. Preferred mixtures of resin-based acids have acid numbers between 150 and 200 mg KOH/g and especially between 160 and 185 mg KOH/g, as for example between 150 and 185 mg KOH/g or between 160 and 200 mg KOH/g.

In a preferred embodiment the carboxylic acid (i) is a hydrocarbon compound of the general formula (3):

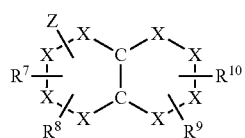

(3)

wherein
X represents carbon, nitrogen and/or oxygen, with the proviso that each of the structural units consisting of four X joined to one another consists either of 4 carbon atoms or 3 carbon atoms and one oxygen atom or one nitrogen atom,
$R^7$, $R^8$, $R^9$ and $R^{10}$ are the same or different and are each a hydrogen atom or a hydrocarbyl group, each of which is bonded to at least one atom of one of the two rings, these hydrocarbyl groups being selected from alkyl groups having one to five carbon atoms, aryl groups, and hydrocarbyl rings having five to six atoms, which optionally contain a heteroatom, such as nitrogen or oxygen, where the hydrocarbon ring is saturated or unsaturated, unsubstituted or substituted by an optionally olefinic aliphatic radical having one to four carbon atoms, where in each case two of the $R^7$, $R^8$, $R^9$ and $R^{10}$ radicals form such a hydrocarbyl ring, and
Z is a carboxyl group or an alkyl radical bearing at least one carboxyl group.

In a further preferred embodiment, the carboxylic acid (i) is a hydrocarbon compound of the general formula (4):

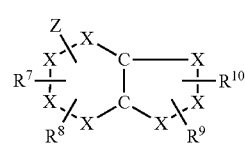

(4)

in which
X represents carbon, nitrogen and/or oxygen, with the proviso that at most one X of each ring is a heteroatom, such as nitrogen or oxygen, and the other X atoms are carbon atoms,
$R^7$, $R^8$, $R^9$ and $R^{10}$ are each as defined above and
Z is bonded to at least one atom of at least one of the two rings and is a carboxyl group or an alkyl radical bearing at least one carboxyl group.

Particularly preferred carboxylic acids (i) having a polycyclic hydrocarbyl residue according to formulae (3) or (4) possess from 12 to 32 carbon atoms, more preferably from 16 to 28 carbon atoms, and especially preferred from 18 to 24 carbon atoms, including the carboxylic acid group, as for example from 12 to 28, or from 12 to 24, or from 16 to 32, or from 16 to 24, or from 18 to 32, or from 18 to 28 carbon atoms, including the carboxylic acid group. The $R^7$, $R^8$, $R^9$ and $R^{10}$ radicals are preferably each alkyl radicals such as methyl, ethyl, n-propyl, isopropyl, n-butyl, isobutyl, tert-butyl and vinyl. Preferably carboxyl group Z is bonded directly to the ring system. Alternatively, carboxyl group Z is bonded to the ring system via an alkylene group, for example via a methylene group.

In formulae (3) and (4), the cycloaliphatic hydrocarbyl residue of the carboxylic acid (i) may be saturated or unsaturated. Preferably, unsaturated cycloaliphatic hydrocarbyl residues contain one, two or three C=C-double bonds. The double bonds may be in the cyclic structural units or they may be attached to them, however, each ring comprises at most one double bond. Preferably, at least one ring system contains a double bond.

Especially preferred resin acids have the empirical formula $C_1$—$H_{29}COOH$ and contain three fused aliphatic rings. Examples for preferred resin acids are abietic acid (5) and pimaric acid (6).

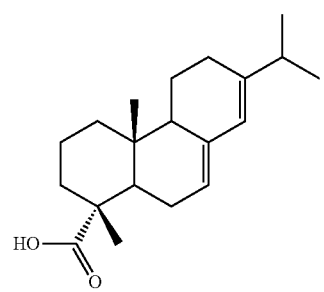

(5)

-continued (6)

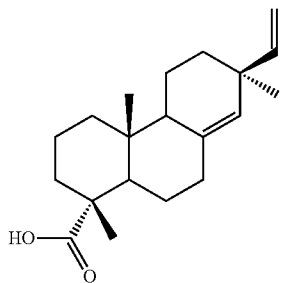

Mixtures of naphthenic acids and resin acids are similarly suited. Preferably they are mixed in a weight ratio between 1:10 and 10:1 and especially preferred between 1:5 and 5:1 as for example between 1:5 and 10:1 or between 1:10 and 5:1.

In a further preferred embodiment, the carboxylic acid containing an optionally substituted cycloaliphatic hydrocarbyl residue (i) is used for the preparation of co-additive (A) in admixture with a minor amount of an essentially linear carboxylic acid. Essentially linear means that the hydrocarbyl residue of the carboxylic acid may contain branches, e.g. alkyl branches and/or double bonds, but that it does not contain a cyclic structure. Preferred essentially linear carboxylic acids have 10 to 28, more preferred 12 to 26 and especially preferred 14 to 24 carbon atoms, as for example 10 to 26, or 10 to 24, or 12 to 28, or 12 to 24, or 14 to 28, or 14 to 26 carbon atoms. A preferred group of essentially linear carboxylic acids are fatty acids. Especially preferred fatty acids are linear. Preferred fatty acids may be saturated or unsaturated and more preferably they are unsaturated. Preferred unsaturated fatty acids contain one, two or three C=C double bonds. Examples for unsaturated fatty acids are palmitoleic, acid oleic acid, linoleic acid linoleic acid. Preferably the content of essentially linear carboxylic acids in a mixture with carboxylic acids containing an optionally substituted cycloaliphatic hydrocarbyl residue (i) is below 50 mol-%, more preferably below 30 mol-% and especially preferred below 25 mol-%. When essentially linear carboxylic acids are present, the molar portions given refer to the combined content of the carboxylic acid containing an optionally substituted cycloaliphatic hydrocarbyl residue (i) and the essentially linear carboxylic acid.

The use of carboxylic acid derivatives of carboxylic acids (i) as for example their anhydrides or esters with lower alcohols for the synthesis of co-additive (A) is similarly suited. Preferred lower alcohols have 1 to 6 carbon atoms and especially 1 to 4 carbon atoms. Examples for preferred lower alcohols are methanol, ethanol, propanol, iso-propanol and the various isomers of butanol.

Alkylene Polyamines (ii)

The term "alkylene polyamine" as used herein refers to organic molecules containing two or more amino groups being separated from each other by alkylene groups having at least two carbon atoms. This includes diamines as well as polyamines having three or more amino groups, as for example up to 10 amino groups. Preferred alkylene polyamines (ii) contain from 2 to 30 carbon atoms, more preferred from 3 to 20 carbon atoms and especially preferred from 3 to 12 carbon atoms, as for example from 2 to 20 carbon atoms, or from 2 to 12, or from 3 to 30 carbon atoms.

In a preferred embodiment, the alkylene polyamine (ii) has the general formula (7)

$$HNR^2—(CH_2)_o—[NR^3—(CH_2)_m]_p—NR^4R^5 \quad (7)$$

wherein
$R^2$ and $R^3$ are, independently from each other, selected from hydrogen and a hydrocarbyl residue having 1 to 20 carbon atoms,
$R^4$ is hydrogen or a hydrocarbyl residue having 1 to 20 carbon atoms,
$R^5$ is independently from $R^4$ selected from hydrogen, an optionally substituted hydrocarbyl residue having 1 to 20 carbon atoms and an acyl group having the structure —C(=O)—$R^1$, with the proviso that $R^4$ and $R^5$ together may form a 5- or 6-membered ring,
o is an integer from 2 to 5, and preferably 2 or 3,
m is an integer from 2 to 5, and preferably 2 or 3, and
p is 0 or an integer from 1 to 10.

In preferred alkylene polyamines of formula (7) p is 0. Especially preferred are alkylene diamines wherein the alkylene group —$(CH_2)_o$— has from 1 to about 10 carbon atoms, more preferably from 2 to 6 carbon atoms and especially preferred 2 or 3 carbon atoms as for example 2 carbon atoms. Preferably, $R^2$ is hydrogen or an aliphatic group of up to 10 carbon atoms. Most preferably $R^2$ is hydrogen. Preferably $R^4$ is hydrogen or a hydrocarbyl residue having from 1 to 10 and especially preferred from 1 to 5 carbon atoms. Preferably $R^5$ independently from $R^4$ is hydrogen or an optionally substituted hydrocarbyl residue having from 1 to 10 and especially preferred from 1 to 5 carbon atoms. In a preferred embodiment $R^4$ and $R^5$ both are hydrogen. In a further preferred embodiment $R^4$ is hydrogen and $R^5$ is an optionally substituted hydrocarbyl residue. Preferred substituent of alkyl groups $R^5$ is a hydroxy group; accordingly, a in preferred embodiment $R^5$ is a hydroxyalkyl group.

Preferred alkylene diamines (ii) include ethylenediamine, propylenediamine, 1,2-diaminopropane, tetramethylene diamine, 1,2-diaminobutane, 2,3-diaminobutane, hexamethylene diamine, octamethylene diamine and higher homologues thereof; examples for preferred alkylene diamines containing N-alkylated amino groups include N-methyl ethylenediamine, N-ethyl ethylenediamine, N-octadecyl ethylenediamine, N-(hydroxyethyl)ethylenediamine, N,N-dimethylaminoethylamine, N,N-dimethylaminopropylamine, N,N-diethylaminopropylamine, N,N-dipropylaminopropylamine, N,N-dimethylaminobutylamine, N,N-dimethylaminopentylamine and their mixtures.

In more preferred alkylene polyamines of formula (7) p is an integer between 1 and 7 and more preferably between 2 and 4, as for example between 1 and 4, or between 2 and 10, or between 2 and 7. Especially preferred are alkylene polyamines wherein p is 1, 2 or 3. Preferably the alkylene groups —$(CH_2)_o$— and —$(CH_2)_m$— independently from each other have from 1 to about 10 carbon atoms, more preferably from 2 to 6 carbon atoms and especially preferred 2 or 3 carbon atoms. The respective indices o and m may be the same or different. In a preferred embodiment they are the same. Preferably, $R^2$ and $R^3$ independently from each other are hydrogen or an aliphatic group of up to 10 carbon atoms. Most preferably $R^2$ and $R^3$ both are hydrogen. Preferably $R^4$ is hydrogen or a hydrocarbyl residue having from 1 to 10 and especially preferred from 1 to 5 carbon atoms. Preferably $R^5$ independently from $R^4$ is hydrogen or an optionally substituted hydrocarbyl residue having from 1 to 10 and especially preferred from 1 to 5 carbon atoms. In a preferred embodiment $R^4$ and $R^5$ both are hydrogen. In a further preferred embodiment $R^4$ is hydrogen and $R^5$ is an optionally substituted hydrocarbyl residue. Preferred substituent of alkyl groups $R^5$ is a hydroxy group; accordingly, in preferred embodiment $R^5$ is a hydroxyalkyl group.

In a preferred embodiment the alkylene polyamine (7) contains a cyclic structure wherein $R^4$ and $R^5$ together form a ring having, together with the nitrogen atom to which they are attached, 5 or 6 ring members and containing one further nitrogen atom. Preferred structures are imidazoline and piperazine structures.

Preferred alkylene polyamines (ii) include ethylene polyamines, propylene polyamines, butylene polyamines, pentylene polyamines, etc. having 3, 4, 5 or more amino groups and their mixtures. Ethylene polyamines are especially preferred. Ethylene polyamines may be prepared by the reaction of ethylene dichloride with ammonia or by reaction of an ethylene imine with a ring opening reagent such as water, ammonia, etc. These reactions result in the production of a complex mixture of polyalkylene polyamines including cyclic condensation products such as piperazines.

In a further preferred embodiment, the amine is a polyamine bottoms or a heavy polyamine. Such mixtures of higher polyamines result from the stripping of a polyamine mixture obtained for example from above mentioned preparation processes upon removal of the lower molecular weight polyamines and volatile components to leave, as residue, the polyamine bottoms.

Examples for preferred higher alkylene polyamines (ii) are diethylene triamine, triethylene tetramine, tetraethylene pentamine, pentaethylene hexamine, hexaethylene heptamine, heptaethylene octaamine, dipropylene triamine, tripropylene tetramine and higher homologues thereof. Examples for preferred polyalkylene amines containing N-alkylated amino groups include 1-methyl diethylenetriamine, N,N-dibutyl diethylenetriamine and N-(hydroxyethyl) diethylenetriamine. Preferred alkylene polyamines containing cyclic are 1-(2-aminoethyl) piperazine, 2-methyl-1-(2-aminobutyl) piperazine, 2-heptyl-3-(2-aminopropyl)imidazoline, 4-methyl-3-(aminoethyl) imidazoline, 1,3-bis(2-aminoethyl) imidazoline, and 1,4-bis(2-aminoethyl) piperazine.

In a preferred embodiment the carboxylic acid (i) and the alkylene polyamine (ii) are reacted in a molar ratio of between 5:1 and 1:5, more preferably in a molar ratio of between 2:1 and 1:2 and especially preferred in a ratio of between 1.2:1 and 1:1.2, as for example in a ratio of between 5:1 and 1:2, or in a ratio of between 5:1 and 1:1.2, or in a ratio of between 2:1 and 1:5, or in a ratio of between 2:1 and 1.2, or in a ratio of between 1.2:1 and 1:5, or in a ratio of between 1.2:1 and 1:2. For alkylene polyamines (ii) having 4 or more nitrogen atoms the molar ratio of the carboxylic acid may be doubled in order to obtain diamides and/or bis-imidazolines.

Preferably the reaction is accomplished by mixing the reactants and heating of the mixture, preferably with stirring, to a temperature of from about 100° C. up to the decomposition temperature of the reaction mixture. The presence of a solvent in the reaction is often advantageous to facilitate mixing and temperature control. The solvent may be a hydrocarbon or an inert polar solvent. Examples for suited solvents are benzene, toluene, xylene, naphtha, n-hexane, cyclohexane, dodecane, octane, and commercially available hydrocarbon mixtures including mineral oils, as well as chlorobenzene, ethylene dichloride, dioxane, ether, chloroform, carbon tetrachloride, or nitrobenzene.

The temperature at which the reaction is carried out depends primarily upon the nature of the reactants used and the product desired. In general, a temperature above 100° C. and up to 150° C. is used to produce amidoamines according to formula (1) having predominantly amide linkages. At higher temperatures, usually above about 150° C., the formation of imidazolines according to formula (2) becomes the preferred reaction. As will be obvious for those skilled in the art, the formation of imidazolines (2) requires the presence of a primary amino group in the alkylene polyamine (7), for example when $R^2$ is hydrogen. Furthermore, for the formation of imidazolines (2) an alkylene polyamine (7) wherein o is 2 is preferred.

It is to be understood that since available mono- and polycyclic carboxylic acids are mixtures, since some of the alkylene polyamines are mixtures, and since the molar ratios of the acid and amine are subject to some variation, the products are better described as reaction products than as individual compounds.

Polymeric Wax Inhibitors (B)

Preferred polymeric wax inhibitors (B) in the various aspects of the invention are, for example, a) copolymers of ethylene with ethylenically unsaturated esters, ethers and/or $C_3$ to $C_{30}$-alkenes,
b) homo- or copolymers of ethylenically unsaturated carboxylic acids, bearing $C_{12}$-$C_{50}$-alkyl radicals bound via ester, amide and/or imide groups,
c) ethylene copolymers grafted with ethylenically unsaturated esters and/or ethers, and
d) condensation products of alkyl substituted phenols with aldehydes and/or ketones.

Preferred copolymers of ethylene with ethylenically unsaturated esters, ethers or alkenes (a) are especially those which, as well as ethylene, contain 4 to 18 mol-%, especially 7 to 15 mol-%, of at least one vinyl ester, acrylic ester, methacrylic ester, alkyl vinyl ether and/or alkene.

The vinyl esters contained in copolymers of ethylene with ethylenically unsaturated esters, ethers and/or $C_3$ to $C_{30}$-alkenes (a) are preferably those of the formula (8)

$$CH_2=CH-OCOR^{11} \qquad (8)$$

in which
$R^{11}$ is $C_1$- to $C_{30}$-alkyl, preferably $C_4$- to $C_{16}$-alkyl, especially $C_6$- to $C_{12}$-alkyl as for example $C_1$- to $C_{16}$-alkyl, $C_1$- to $C_{12}$-alkyl, $C_4$- to $C_{30}$-alkyl, $C_4$- to $C_{12}$-alkyl, $C_6$- to $C_{30}$-alkyl or $C_6$- to $C_{16}$-alkyl.

The alkyl radicals $R^{11}$ may be linear or branched. In a preferred embodiment, the alkyl radicals are linear alkyl radicals having 1 to 18 carbon atoms. Especially preferred alkyl radical are methyl and ethyl. In a further preferred embodiment, $R^{11}$ is a branched alkyl radical having 3 to 30 carbon atoms and more preferably having 5 to 16 carbon atoms. Particularly preferred vinyl esters are derived from secondary and especially tertiary carboxylic acids whose branch is in the alpha position to the carbonyl group. Especially preferred are the vinyl esters of tertiary carboxylic acids which are also known as Versatic acid vinyl esters and which possess neoalkyl radicals having 5 to 11 carbon atoms, especially having 8, 9 or 10 carbon atoms. Suitable vinyl esters include vinyl acetate, vinyl propionate, vinyl butyrate, vinyl isobutyrate, vinyl hexanoate, vinyl heptanoate, vinyl octanoate, vinyl pivalate, vinyl 2-ethylhexanoate, vinyl laurate, vinyl stearate, and Versatic esters such as vinyl neononanoate, vinyl neodecanoate, vinyl neoundecanoate. An especially preferred vinyl ester is vinyl acetate.

In a further embodiment, the alkyl groups mentioned may be substituted by one or more hydroxyl groups.

In a further preferred embodiment, these ethylene copolymers contain vinyl acetate and at least one further vinyl ester of the formula 1 in which $R^{11}$ is $C_4$- to $C_{30}$-alkyl, preferably $C_4$- to $C_{16}$-alkyl and especially $C_6$- to $C_{12}$-alkyl.

Preferred further vinyl esters are the above-described vinyl esters of this chain length range.

The acrylic and methacrylic esters contained in copolymers of ethylene with ethylenically unsaturated esters, ethers and/or $C_3$ to $C_{30}$-alkenes (a) are preferably those of the formula (9)

$$CH_2=CR^{12}-COOR^{13} \qquad (9)$$

in which
- $R^{12}$ is hydrogen or methyl and
- $R^{13}$ is $C_1$- to $C_{30}$-alkyl, preferably $C_4$- to $C_{24}$-alkyl, especially $C_6$- to $C_{18}$-alkyl as for example $C_1$- to $C_{18}$-alkyl, $C_1$- to $C_{24}$-alkyl, $C_4$- to $C_{30}$-alkyl, 04- to $C_{18}$-alkyl, $C_6$- to $C_{30}$-alkyl or $C_6$- to $C_{24}$-alkyl.

The alkyl radicals $R^{13}$ may be linear or branched. In a preferred embodiment, they are linear. In a further preferred embodiment, they possess a branch in the 2-position to the ester moiety. Suitable acrylic esters include, for example, methyl (meth)acrylate, ethyl (meth)acrylate, propyl (meth)acrylate, n- and isobutyl (meth)acrylate, hexyl (meth)acrylate, octyl (meth)acrylate, 2-ethylhexyl (meth)acrylate, 2-propylheptyl (meth)acrylate, 4-methyl-2-propylhexyl (meth)acrylate, decyl (meth)acrylate, dodecyl (meth)acrylate, iso-tridecyl (meth)acrylate, tetradecyl (meth)acrylate, hexadecyl (meth)acrylate, iso-heptadecyl (meth)acrylate, octadecyl(meth)acrylate, eicosyl (meth)acrylate, and mixtures of these comonomers, the formulation "(meth)acrylate" including the corresponding esters of acrylic acid and of methacrylic acid.

The alkyl vinyl ethers contained in copolymers of ethylene with ethylenically unsaturated esters, ethers and/or $C_3$ to $C_{30}$-alkenes (a) are preferably compounds of the formula (10)

$$CH_2=CH-OR^{14} \qquad (10)$$

in which
- $R^{14}$ is $C_1$- to $C_{30}$-alkyl, preferably $C_4$- to $C_{16}$-alkyl, especially $C_6$- to $C_{12}$-alkyl as for example $C_1$- to $C_{16}$-alkyl, $C_1$- to $C_{12}$-alkyl, $C_4$- to $C_{30}$-alkyl, $C_4$- to $C_{12}$-alkyl, $C_6$- to $C_{30}$-alkyl or $C_6$- to $C_{16}$-alkyl.

The alkyl radicals may be linear or branched. Suitable alkyl vinyl ethers include, for example methyl vinyl ether, ethyl vinyl ether, isobutyl vinyl ether, and their mixtures.

The alkenes contained in copolymers of ethylene with ethylenically unsaturated esters, ethers and/or $C_3$ to $C_{30}$-alkenes (a) are preferably monounsaturated hydrocarbons having 3 to 30 carbon atoms, more particularly 4 to 16 carbon atoms and especially 5 to 12 carbon atoms as for example 3 to 16 carbon atoms, 3 to 12 carbon atoms, 4 to 30 carbon atoms, 4 to 12 carbon atoms, 5 to 30 carbon atoms or 5 to 16 carbon atoms. Suitable alkenes include propene, butene, isobutene, pentene, hexene, 4-methylpentene, heptene, octene, decene, diisobutylene and norbornene, and derivatives thereof such as methylnorbornene and vinylnorbornene.

The alkyl radicals $R^{11}$, $R^{13}$ and $R^{14}$ may bear minor amounts of functional groups, for example amino, amido, nitro, cyano, hydroxyl, keto, carbonyl, carboxyl, ester and sulfo groups and/or halogen atoms, provided that they do not significantly impair the hydrocarbon character of the radicals mentioned.

Particularly preferred terpolymers of ethylene contain, apart from ethylene, preferably 3.5 to 17 mol-% and especially 5 to 15 mol-% of vinyl acetate, and 0.1 to 10 mol-% and especially 0.2 to 5 mol-% of at least one long-chain vinyl ester, (meth)acrylic ester, vinyl ether and/or alkene, whereby the total comonomer content is between 4 and 18 mol-% and preferably between 7 and 15 mol-%. Particularly preferred termonomers are vinyl 2-ethylhexanoate, vinyl neononanoate, vinyl neodecanoate 2-ethyl hexyl acrylate, 2-propyl heptylacrylate, 4-methyl-2-propyl hexylacrylate and their mixtures. Further particularly preferred copolymers contain, in addition to ethylene and 3.5 to 17.5 mol-% of vinyl esters, also 0.1 to 10 mol-% of an olefin such as propene, butene, isobutene, hexene, 4-methylpentene, octene, diisobutylene, norbornene, styrene or any combination thereof.

The number average molecular weight of the ethylene copolymers (a) as determined by gel permeation chromatography in THF against poly(styrene) standards is preferably between 2.000 and 50.000 and especially between 2.500 and 30.000 g/mol as for example between 2.000 and 30.000 g/mol or between 3.000 and 50.000 g/mol. The mass average molecular weight is preferably between 5.000 and 300.000 g/mol and especially between 7.000 and 250.000 g/mol as for example between 5.000 and 250.000 g/mol or between 7.000 and 300.000 g/mol. The $MFI_{190}$ values of the ethylene copolymers (a), measured according to DIN 53735 at 190° C. and an applied load of 2.16 kg, are preferably between 0.1 and 1200 g/10 min and especially between 1 and 900 g/min. The degrees of branching determined by means of $^1$H NMR spectroscopy are preferably between 1 and 12 $CH_3$/100 $CH_2$ groups, especially between 2 and 8 $CH_3$/100 $CH_2$ groups, which do not originate from the comonomers.

In a preferred embodiment a mixture of two or more of the abovementioned ethylene copolymers (a) is used, wherein the polymers on which the mixture is based differ in at least one characteristic. For example, they may contain different comonomers and/or different comonomer contents, and/or they may have different molecular weights and/or degrees of branching.

The copolymers of ethylene with ethylenically unsaturated esters, ethers and/or $C_3$ to $C_{30}$-alkenes (a) are prepared by known processes (on this subject, see, for example, Ullmanns Encyclopädie der Technischen Chemie, $5^{th}$ edition, vol. A 21, pages 305 to 413). Suitable methods are polymerization in solution, in suspension and in the gas phase, and high-pressure bulk polymerization. Preference is given to employing high-pressure bulk polymerization, which is performed at pressures of 50 to 400 MPa, preferably 100 to 300 MPa, and temperatures of 50 to 350° C., preferably 100 to 300° C. The reaction of the comonomers is initiated by free-radical-forming initiators (free-radical chain initiator). This substance class includes, for example, oxygen, hydroperoxides, peroxides and azo compounds, such as cumene hydroperoxide, t-butyl hydroperoxide, dilauroyl peroxide, dibenzoyl peroxide, bis(2-ethylhexyl) peroxodicarbonate, t-butyl permaleate, t-butyl perbenzoate, dicumyl peroxide, t-butyl cumyl peroxide, di(t-butyl peroxide, 2,2'-azobis(2-methylpropanonitrile), 2,2'-azobis(2-methylbutyronitrile).

The desired molecular weight of the copolymers (a), for a given composition of the comonomer mixture, is adjusted by varying the reaction parameters of pressure and temperature, and if appropriate by adding moderators. Useful moderators have been found to be hydrogen, saturated or unsaturated hydrocarbons, for example propane and propene, aldehydes, for example propionaldehyde, n-butyraldehyde and isobutyraldehyde, ketones, for example acetone, methyl ethyl ketone, methyl isobutyl ketone and cyclohexanone, or alcohols, for example butanol. Depending on the desired molecular weight, the moderators are employed in amounts up to 20% by weight, preferably 0.05 to 10% by weight, based on the comonomer mixture.

Preferred homo- or copolymers of ethylenically unsaturated carboxylic acids bearing $C_{12}$-$C_{50}$-alkyl radicals bound via ester, amide and/or imide groups (b) contain repeat structural elements of the formulae (11A) and/or (11B)

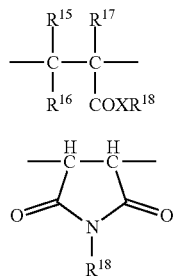

11A

11B wherein
- $R^{15}$ and $R^{16}$ are each independently hydrogen, phenyl or a group of the formula $COXR^{18}$,
- $R^{17}$ is hydrogen, methyl or a group of the formula —$CH_2COXR^{18}$
- X is O, NH or $NR^{18}$,
- $R^{18}$ is hydrogen or $R^{24}$ and
- $R^{24}$ is a $C_{12}$- to $C_{50}$-alkyl or -alkylene radical, preferably a $C_{14}$- to $C_{30}$-alkyl or -alkylene radical and especially preferred a $C_{18}$- to $C_{24}$-alkyl or -alkylene radical as for example a $C_{12}$- to $C_{30}$-alkyl or -alkylene radical, a $C_{12}$- to $C_{24}$-alkyl or -alkylene radical, a $C_{14}$- to $C_{50}$-alkyl or -alkylene radical, a $C_{14}$- to $C_{24}$-alkyl or -alkylene radical, a $C_{18}$- to $C_{50}$-alkyl or -alkylene radical or a $C_{18}$- to $C_{30}$-alkyl or -alkylene radical,
- with the proviso that the repeat structural units (11A) contain at least one and at most two groups of the formula —$COXR^{18}$ in one structural element, wherein at least one radical $R^{18}$ is $R^{24}$.

The repeat structural elements of the formulae (11A) include but are not limited to structures derived from ethylenically unsaturated monocarboxylic acid esters, monocarboxylic acid amides, dicarboxylic acid monoesters, dicarboxylic acid diesters, dicarboxylic acid monoamides, dicarboxylic acid diamides and their mixtures.

Particularly preferred homo- and copolymers (b) are those containing structural units 11A wherein $R^{15}$ and $R^{16}$ are each hydrogen, X is O and $R^{17}$ is hydrogen or methyl. These structural units 11A derive from esters of monocarboxylic acids, for example from acrylic acid or methacrylic acid. Particular preference is given to the esters of acrylic acid.

Further particularly preferred homo- and copolymers (b) are those containing structural units of formula 11A, wherein one of $R^{15}$ and $R^{16}$ is $COXR^{24}$ and the other is hydrogen, and $R^{17}$ is hydrogen. Such structural units derive from monoesters, diesters, monoamides and diamides of ethylenically unsaturated dicarboxylic acids, for example from maleic acid, fumaric acid or itaconic acid. Further particularly preferred homo- and copolymers (b) are those containing structural units of formula 11B which derive from imides of dicarboxylic acids, for example from maleic acid, fumaric acid or itaconic acid.

Preferred alcohols for the esterification of the ethylenically unsaturated mono- and dicarboxylic acids either for the preparation of esters as starting materials for the preparation of homo- or copolymers (b) or for polymer analogous reaction with respective polymers bearing acid groups are those having 12 to 50 carbon atoms, preferably those having 14 to 30 carbon atoms and especially those having 18 to 24 carbon atoms as for example those having 12 to 30 carbon atoms, 12 to 24 carbon atoms, 14 to 50 carbon atoms, 14 to 24 carbon atoms, 18 to 50 carbon atoms or 18 to 30 carbon atoms. They may be of natural or synthetic origin. The alkyl radicals are preferably linear or at least substantially linear. Essentially linear means that at least 75 mol-% and especially at least 90 mol-% of the alcohols are linear. Suitable fatty alcohols include 1-decanol, 1-dodecanol, 1-tridecanol, isotridecanol, 1-tetradecanol, 1-hexadecanol, 1-octadecanol, eicosanol, docosanol, tetracosanol, hexacosanol and their mixtures. Especially preferred are mixtures originating from renewable natural resources, as for example coconut fatty alcohol, tallow fatty alcohol, hydrogenated tallow fatty alcohol and behenyl alcohol.

Preferred amines for the amidation and/or imidiation of the ethylenically unsaturated mono- and dicarboxylic acids either for the preparation of amides/imides as starting materials for the preparation of homo- or copolymers (b) or for polymer analogous reaction with respective polymers bearing acid groups are those having 12 to 50 carbon atoms, preferably those having 14 to 30 carbon atoms and especially those having 18 to 24 carbon atoms as for example those having 12 to 30 carbon atoms, 12 to 24 carbon atoms, 14 to 50 carbon atoms, 14 to 24 carbon atoms, 18 to 50 carbon atoms or 18 to 30 carbon atoms. They may be of natural or synthetic origin. The alkyl radicals are preferably linear or at least substantially linear. Suitable fatty amines include 1-decyl amine, 1-dodecyl amine, 1-tridecyl amine, isotridecyl amine, 1-tetradecyl amine, 1-hexadecyl amine, 1-octadecyl amine, eicosyl amine oleyl amine and their mixtures. Especially preferred are mixtures originating from renewable natural resources, as for example coco fatty amine, tallow fatty amine, hydrogenated tallow fatty amine and behenyl amine.

In a preferred embodiment the polymeric wax inhibitor (b) is a copolymer comprising, besides the structural units derived from $C_{12}$ to $C_{50}$ alkyl esters of unsaturated carboxylic acids according to formulae 11A and/or 11B, further comonomers such as vinyl esters of the formula (8), $C_1$ to $C_{18}$ alkyl (meth)acrylic esters of the formula (9), alkyl vinyl ethers of the formula (10) and/or alkenes. Preferred vinyl esters correspond to the definition given for formula (8). Particular preference is given to vinyl acetate.

Preferred alkenes as comonomers in the polymeric wax inhibitor (b) are α-olefins, i.e. linear olefins with a terminal double bond, preferably having from 6 to 50 carbon atoms, more preferably having from 10 to 36 carbon atoms, more preferably having from 16 to 30 carbon atoms and especially preferred having 18 to 24 carbon atoms, as for example having from 10 to 50, or from 10 to 30, or from 10 to 24, or from 16 to 50, or from 16 to 36, or from 16 to 24, or from 18 to 50, or from 18 to 36 or from 18 to 30 carbon atoms. Examples of suitable α-olefins are 1-octene, 1-nonene, 1-decene, 1-dodecene, 1-tridecene, 1-tetradecene, 1-pentadecene, 1-hexadecene, 1-heptadecene, 1-octadecene, 1-nonadecene, 1-eicosene, 1-henicosene, 1-docosene, 1-tetracosene and their mixtures. Likewise, commercially available chain cuts, for example $C_{13-18}$-α-olefins, $C_{12-16}$-α-olefins, $C_{14-16}$-α-olefins, $C_{14-18}$-α-olefins, $C_{16-18}$-α-olefins, $C_{16-20}$-α-olefins, $C_{22-28}$-α-olefins, $C_{30+}$-α-olefins are suited.

Furthermore, preferred copolymers (b) may comprise one or more further comonomers. Preferred further comonomers are ethylenically unsaturated compounds bearing a functional group, wherein the functional group preferably contains oxygen and/or nitrogen. Examples for such comonomers are allyl polyglycols, hydroxyethyl acrylate, hydroxypropyl acrylate, hydroxybutyl acrylate, dimethylaminoethyl acrylate, amides of (meth)acrylic acid, vinylpyridine, vinylpyrrolidone, acrylic acid, methacrylic acid, p-acetoxystyrene, vinyl methoxyacetate and perfluoroalkyl acrylate. Their proportion in the polymer is preferably less than 20 mol-%, especially between 1 and 15 mol-%, for example between 2 and 10 mol-% as for example between 1 and 20 mol-%, between 2 and 20 mol-% or between 1 and 10 mol-%.

Allyl polyglycols suitable as comonomers may, in a preferred embodiment of the invention, comprise 1 to 50 ethoxy and/or propoxy units and correspond to the formula (12):

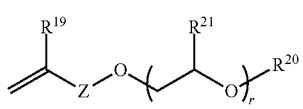

wherein
R$^{19}$ is hydrogen or methyl,
Z is C$_1$-C$_3$-alkyl,
R$^{20}$ is hydrogen, C$_1$-C$_{30}$-alkyl, cycloalkyl, aryl or —C(O)—R$^{22}$,
R$^{21}$ is hydrogen or C$_1$-C$_{20}$-alkyl,
R$^{22}$ is C$_1$-C$_{30}$-alkyl, C$_3$-C$_{30}$-alkenyl, cycloalkyl or aryl and
r is from 1 to 50, preferably 1 to 30.

Particular preference is given to comonomers of the formula 12 in which R$^{19}$ and R$^{21}$ are each hydrogen, R$^{20}$ is hydrogen or a C$_1$-C$_4$-alkyl group and Z is a methylene group.

Preferred homo- or copolymers (b) contain at least 10 mol-% and up to 100 mol-%, preferably 20 to 95 mol-%, more preferably 30 to 90 mol-% and especially preferred 40 to 80 mol-% as for example at least 30 mol-%, or at least 40 mol-%, or 10 to 95 mol-%, or 10 to 90 mol-%, or 10 to 80 mol-%, or 20 to 100 mol-%, or 20 to 90 mol-%, or 20 to 80 mol-%, or 30 to 95 mol-%, or 30 to 80 mol-%, or 40 to 100 mol-%, or 40 to 95 mol-%, or 40 to 90 mol-% of structural units according to formulae 11A and/or 11B. In a specifically preferred embodiment, the wax inhibitors (b) contain at least 90 mol-% of structural units derived from esters of ethylenically unsaturated monocarboxylic acids, said esters bearing C$_{12}$-C$_{50}$-alkyl radicals as outlined above.

Due to the specific mechanism of copolymerization, preferred copolymers (b) of an ethylenically unsaturated dicarboxylic acid with an olefin contain between 25 and 75 mol-%, more preferably between 40 and 60 mol-% and as for example between 25 and 60 mol-% or between 40 and 75 mol-% of units derived from the dicarboxylic acid; and between 75 and 25 mol-%, more preferably between 60 and 40 mol-% as for example between 75 and 40 mol-% or between 60 and 25 mol-% of the olefin.

Preferred homo- or copolymers (b) are, for example, poly(alkyl acrylates); poly(alkyl methacrylates); copolymers of alkyl (meth)acrylates with vinylpyridine; copolymers of alkyl (meth)acrylates with allyl polyglycols; esterified and/or amidated copolymers of alkyl (meth)acrylates with maleic anhydride; copolymers of esterified and/or amidated ethylenically unsaturated dicarboxylic acids, for example dialkyl maleates or dialkyl fumarates, with α-olefins; copolymers of esterified and/or amidated ethylenically unsaturated dicarboxylic acids, for example dialkyl maleates or fumarates, with unsaturated vinyl esters, for example vinyl acetate; copolymers of esterified ethylenically unsaturated dicarboxylic acids, for example dialkyl maleates or fumarates, with styrene; or else copolymers of amidated and/or imidized ethylenically unsaturated dicarboxylic acids, for example dialkyl maleamides or dialkyl fumaramides with α-olefins.

The molecular weight respectively the molar mass distribution of preferred homo- and copolymers (b) is characterized by a K value (measured according to Fikentscher in 5% solution in toluene) of 10 to 100, preferably 15 to 80, as for example 10 to 80 or 15 to 100. The weight average molecular weights (Mw) may be within a range of from 5,000 to 1,000,000 g/mol, preferably from 10,000 to 300,000 g/mol and especially from 25,000 to 100,000 g/mol as for example from 5,000 to 300,000 g/mol, from 5,000 to 100,000 g/mol, from 10,000 to 1,000,000 g/mol, from 10,000 to 100,000 g/mol, from 25,000 to 1,000,000 g/mol or from 25,000 to 300,000 g/mol as determined by means of gel permeation chromatography GPC against poly(styrene) standards.

The homo- and copolymers (b) may be prepared by (co)polymerizing esters, amides and/or imides of ethylenically unsaturated carboxylic acids, especially alkyl acrylates and/or alkyl methacrylates, optionally with further comonomers, by customary free-radical polymerization methods. Solution polymerization is especially preferred. Controlled radical chain reaction protocols are equally suited.

A further means of preparing the homo- and copolymers (b) is the polymer-analogous esterification, amidation and/or imidation of already polymerized ethylenically unsaturated carboxylic acids or acid anhydrides with fatty alcohols having 12 to 50 carbon atoms. Similarly suited is the polymer-analogous transesterification or aminolysis of esters of ethylenically unsaturated carboxylic acids with short-chain alcohols with fatty alcohols respectively fatty amines having 12 to 50 carbon atoms. For example, the transesterification of poly(meth)acrylic acid with fatty alcohols having 12 to 50 carbon atoms leads to homo- and copolymers (b) suitable in accordance with the invention. An especially preferred class of polymeric wax inhibitors (b) can be prepared by copolymerization of unsaturated dicarboxylic acid anhydrides and especially of maleic anhydride with the comonomers described above in essentially equimolar amounts (that is in a molar ratio of between 1:1.5 to 1.5:1) and subsequent polymer analogous esterification of the copolymers with fatty alcohols having 10 to 50 carbons atoms as described above. Similarly, said copolymers of maleic anhydride with α-olefins can be amidated and/or imidized with amines having at least one C$_{12}$-C$_{50}$ alkyl residue and especially having at least one C$_{14}$-C$_{24}$ alkyl residue.

Preferred ethylene copolymers grafted with ethylenically unsaturated esters (c) are, for example, those which comprise
 I) an ethylene copolymer which, in addition to ethylene, contains 4 to 20 mol-% and preferably 6 to 18 mol-% of at least one vinyl ester, acrylic ester, methacrylic ester, alkyl vinyl ether and/or alkene, onto which
 II) a homo- or copolymer of an ester of an α,β-unsaturated carboxylic acid with a C$_{12}$- to C$_{50}$-alcohol has been grafted.

Preferably the ethylene copolymer (I) is one of the copolymers described as a copolymer of ethylene and an ethylenically unsaturated ester, ether and/or C$_3$-C$_{30}$-alkene (a). Ethylene copolymers preferred as the copolymer (I) for the grafting are especially those which, in addition to ethylene, contain 7.5 to 15 mol-% of vinyl acetate. In addition, preferred ethylene copolymers (I) possess $MFI_{190}$ values between 1 and 900 g/min and especially between 2 and 500 g/min as for example between 1 and 500 g/min or between 2 and 900 g/min.

The (co)polymers (II) grafted onto the ethylene copolymers (I) contain preferably 40 to 100% by weight and especially 50 to 90% by weight as for example 40 to 90% by weight or 50 to 100% by weight of one or more structural units derived from alkyl acrylates and/or alkyl methacrylates. Preferably at least 10 mol-%, more preferably 20 to 100 mol-%, particularly preferred 30 to 90 mol-% and especially preferred 40 to 70 mol-% as for example more than 20 mol-%, or more than 30 mol-%, or 10 to 100 mol-%, or 10 to 90 mol-%, or 10 to 70 mol-%, or 20 to 90 mol-%, or 20 to 70 mol-%, or 30 to 100 mol-%, or 30 to 70 mol-%, or 40 to 100 mol-% or 40 to 70 mol-% of the grafted structural units bear alkyl radicals having at least 12 carbon atoms and especially preferred at least 18 carbon atoms. Particularly preferred monomers for the grafting are alkyl (meth)acrylates having $C_{12}$-$C_{50}$-alkyl radicals, more preferably having $C_{14}$-$C_{30}$-alkyl radicals and especially having $C_{18}$-$C_{24}$-alkyl radicals, for example having $C_{18}$-$C_{50}$-alkyl radicals, $C_{18}$-$C_{30}$-alkyl radicals, $C_{18}$-$C_{24}$-alkyl radicals or $C_{20}$—$O_{24}$-alkyl radicals. Preferred alcohols for the preparation of the alkyl acrylates and/or methacrylates are the same as described for the preparation of the esters of unsaturated carboxylic acids used for the preparation of homo- and copolymers (b).

The grafted (co)polymers (II) optionally contain up to 60% by weight, preferably 1 to 50% by weight and more preferably 2 to 10% by weight of one or more further structural units which are derived from further ethylenically unsaturated compounds. Suitable further ethylenically unsaturated compounds are, for example, vinyl esters of carboxylic acids having 1 to 20 carbon atoms, α-olefins having 6 to 40 carbon atoms, vinyl aromatics, dicarboxylic acids and anhydrides and esters thereof with $C_{10}$-$C_{50}$-fatty alcohols, acrylic acid, methacrylic acid and especially ethylenically unsaturated compounds bearing heteroatoms, for example hydroxyethyl acrylate, hydroxypropyl acrylate, hydroxybutyl acrylate, p-acetoxystyrene, vinyl methoxyacetate, dimethylaminoethyl acrylate, perfluoroalkyl acrylate, the isomers of vinylpyridine and derivatives thereof, N-vinylpyrrolidone and (meth)acrylamide and derivatives thereof, such as N-alkyl (meth)acrylamides with $C_1$-$C_{20}$-alkyl radicals. Likewise, allyl polyglycols of the formula (12) in which $R^{19}$, $R^{20}$, $R^{21}$, $R^{22}$, Z and r each have the definitions given under (b) are suited further ethylenically unsaturated compounds.

The ethylene copolymers grafted with ethylenically unsaturated carboxylic acid esters and/or ethers (c) preferably contain the ethylene copolymer (I) and the homo- or copolymer of an ester of an α,β-unsaturated carboxylic acid with a $C_{12}$- to $C_{50}$-alcohol (II) in a weight ratio of 1:10 to 10:1 and more preferably of 1:8 to 5:1, as for example of 1:5 to 1:1.

The graft polymers (c) are prepared by known methods. For example, the grafted polymers (c) are obtainable by mixing ethylene copolymer (1) and comonomer or comonomer mixture for preparation of (II), optionally in the presence of an organic solvent, and adding a free-radical chain initiator.

Preferred condensation products of alkyl substituted phenols with aldehydes and/or ketones (d) are polymers containing structural units which have at least one phenolic OH group, i.e. one OH group bonded directly to the aromatic system, and at least one alkyl, alkenyl, alkyl ether or alkyl ester group bonded to the aromatic system.

Preferred polymeric wax inhibitors (d) contain oligo- or polymers with a repeat structural unit of the formula (13)

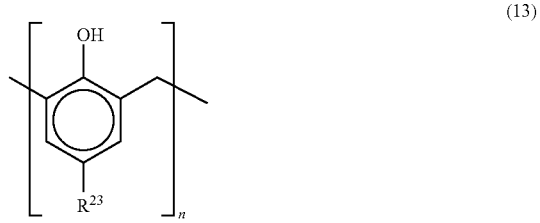

wherein
$R^{23}$ is $C_1$-$C_{200}$-alkyl or $C_2$-$C_{200}$-alkenyl, O—$C_1$-$C_{200}$-alkyl or O—$C_2$-$C_{200}$-alkenyl, C(O)—O—$C_1$-$C_{200}$-alkyl or C(O)—O—$C_2$-$C_{200}$-alkenyl, O—C(O)—$C_1$-$C_{200}$-alkyl or O—C(O)—$C_2$-$C_{200}$-alkenyl and
t is an integer from 2 to 250.

Preferably, the alkyl and alkenyl residues in the radicals $R^{23}$ possess 2 to 100, more preferably 4 to 50 and especially preferred 6 to 36 carbon atoms, as for example 2 to 50 carbon atoms, or 2 to 36 carbon atoms, or 4 to 100 carbon atoms, or 4 to 36 carbon atoms, or 6 to 50 carbon atoms, or 6 to 36 carbon atoms. The alkyl radicals may be linear or branched, preferably they are linear. Examples of preferred alkyl radicals are n-, iso- and tert-butyl, n- and isopentyl, n- and isohexyl, n- and isooctyl, n- and isononyl, n- and isodecyl, n- and isododecyl, tetradecyl, hexadecyl, octadecyl, tripropenyl, tetrapropenyl, poly(propenyl) and poly (isobutenyl) radicals. For ester-type substituents essentially linear alkyl radicals derived from commercially available raw materials are preferred, for example fatty acids respectively fatty alcohols based chain cuts in the chain length range of, for example, $C_{13\text{-}18}$, $C_{12\text{-}16}$, $C_{14\text{-}16}$, $C_{14\text{-}18}$, $C_{16\text{-}18}$, $C_{16\text{-}20}$, $C_{22\text{-}28}$ and $C_{30+}$.

Preferably t is an integer from 3 to 100, more preferably from 5 to 50 and especially preferred from 10 to 35 as for example from 3 to 50, or from 3 to 35, or from 5 to 100, or from 5 to 35, or from 10 to 100 or from 10 to 50. The molecular weight of suited alkyl substituted phenol-aldehyde resins may vary within wide limits. However, a prerequisite for their suitability is that the alkyl substituted phenol-aldehyde resin is oil-soluble at least in concentrations relevant for their use, i.e. that it is soluble in the range of 0.001 to 1% by weight in xylene. The number average molecular weight measured by means of gel permeation chromatography (GPC) against polystyrene standards in THF is preferably between 400 and 50,000 g/mol, more preferably between 800 and 30,000 g/mol and especially between 1,000 and 20,000 g/mol as for example between 400 and 30,000 g/mol, or between 400 and 20,000 g/mol, or between 800 and 50,000 g/mol, or between 800 and 30,000 g/mol, or between 1,000 and 50,000 g/mol, or between 1,000 and 30,000 g/mol.

Preferred aldehydes for the preparation of the alkyl substituted phenol-aldehyde resins are those having 1 to 12 carbon atoms and more preferably those having 1 to 4 carbon atoms, as for example formaldehyde, acetaldehyde, propionaldehyde, butyraldehyde, 2-ethylhexanal, benzaldehyde, glyoxalic acid, and the reactive equivalents thereof, such as paraformaldehyde and trioxane. Particular preference is given to formaldehyde.

In a preferred embodiment, the condensation products of alkyl substituted phenols and aldehydes or ketones (d) are alkyl phenol-aldehyde resins. Alkylphenol-aldehyde resins are known in principle and are described, for example, in Römpp Chemie Lexikon, 9$^{th}$ edition, Thieme Verlag 1988-92, Volume 4, p. 3351 ff. Preferred alkyl phenol-aldehyde resins in accordance with the invention are especially those which derive from alkyl phenols having one or two alkyl radicals in the ortho and/or para position to the OH group. Particularly preferred starting materials are alkyl phenols which bear at least two hydrogen atoms capable of condensation with aldehydes on the aromatic ring, and especially monoalkylated phenols whose alkyl radical is in the para position to the OH group. The alkyl radicals may be the same or different in the alkyl phenol-aldehyde resins usable according to the invention. They may be saturated or unsaturated, preferably they are saturated. Particularly suitable alkyl phenol-aldehyde resins derive from alkyl phenols with branched alkyl radicals having 8 or 9 carbon atoms. Further particularly suitable alkyl phenol-aldehyde resins derive from alkyl phenols with a linear alkyl radical in the chain length range of $C_{20}$ to $C_{36}$.

The alkyl substituted phenol-aldehyde resins (d) are obtainable by known methods, for example by condensing the corresponding alkyl substituted phenols with formaldehyde, i.e. with 0.5 to 1.5 mol and preferably 0.8 to 1.2 mol as for example with 0.5 to 1.2 mol or with 0.8 to 1.5 mole of formaldehyde per mole of alkyl substituted phenol. The condensation can be affected without solvent but preferably it is affected in the presence of a water-immiscible or only partly water-miscible inert organic solvent, such as a mineral oil, an alcohol, an ether and the like. Solvents based on biogenic raw materials, such as fatty acid methyl esters, are also suitable as reaction media.

The polymeric wax inhibitor (B) may be a single wax inhibitor or a mixture of two or more different wax inhibitors. When (B) is a mixture of different wax inhibitors, the components may belong to different groups (a) to (d). Alternatively, the wax inhibitors may belong to the same group but differ in their chemical and/or physicochemical properties as for example in molecular weight, degree of branching, kind of comonomers, content of comonomer(s) and/or alkyl chain length. In preferred mixtures of polymeric wax inhibitors (B) the portion of the individual wax inhibitors is between 5 and 95% by weight, more preferably between 10 to 90% by weight and especially preferred between 20 and 80% by weight, as for example between 5 and 90% by weight, or between 5 and 80% by weight, or between 10 and 95% by weight, or between 10 and 80% by weight, or between 20 and 95% by weight, or between 20 and 90% by weight, based on the total amount of polymeric wax inhibitors (B) used, with the proviso that the sum of the components does not exceed 100%.

The content of polymeric wax inhibitor (B) in the wax inhibitor composition according to the invention is adjusted by the person skilled in the art according to the targeted properties of the composition, as for example to its physical properties versus the required dosage rate. By the addition of co-additive (A) and organic solvent (C) the flow properties of the wax inhibitor composition including its pour point, its viscosity, and its dissolution behavior are balanced against the desired performance in the paraffin-containing hydrocarbon fluid according to the requirements. Preferred wax inhibitor compositions contain between 3 and 60% by weight, more preferably between 5 and 50% by weight and especially preferred between 10 and 40% by weight of the polymeric wax inhibitor (B), as for example between 3 and 50% by weight, or between 3 and 40% by weight, or between 5 and 60% by weight, or between 5 and 40% by weight, or between 10 and 60% by weight, or between 10 and 50% by weight, based on the total weight of the wax inhibitor composition comprising co-additive (A), polymeric wax inhibitor (B) and organic solvent (C).

In the wax inhibitor composition according to the invention the portion of co-additive (A) is preferably between 0.1 and 50 wt.-%, more preferably between 1 and 30 wt.-% and especially preferred between 2 and 15 wt.-% based on the combined masses of (A) and (B), as for example between 0.1 and 30 wt.-%, or between 0.1 and 15 wt.-%, or between 1 and 50 wt.-%, or between 1 and 15 wt.-%, or between 2 and 50 wt.-%, or between 2 and 30 wt.-% of the combined masses of (A) and (B). Accordingly, the portion of the polymeric paraffin inhibitor (B) in the wax inhibitor composition according to the invention is preferably between 50 and 99.9 wt.-%, more preferably between 70 and 99 wt.-% and especially preferred between 85 and 98 wt.-%, as for example between 50 and 99 wt.-%, or between 50 and 98 wt.-%, or between 70 and 99.9 wt.-%, or between 70 and 98 wt.-%, or between 85 and 99.9 wt.-%, or between 85 and 99 wt.-% of the combined masses of (A) and (B). In a further preferred embodiment the weight ratio between co-additive (A) and polymeric wax inhibitor (B) is between 1:100 and 1:1, more preferably between 1:50 and 1:3 and especially preferred between 1:30 and 1:6 as for example between 1:100 and 1:3, or between 1:100 and 1:6, or between 1:50 and 1:1, or between 1:50 and 1:6, or between 1:30 and 1:1, or between 1:30 and 1:3.

Organic Solvent (C)

In a preferred embodiment the wax inhibitor composition according to the invention comprises, besides (A) and (B), an organic solvent (C) selected from aliphatic, cycloaliphatic, aromatic and/or alkylaromatic hydrocarbons and mixtures thereof. Especially preferred solvents are those having a flashpoint above 60° C., since fewer restrictions must be observed for transport and storage of the concentrates when such solvents are used.

A first group of preferred solvents are alkyl aromatic hydrocarbons. Examples for preferred alkyl aromatic hydrocarbons are toluene, ethylbenzene, xylene, diethylbenzene, naphthalene and their mixtures. A second group of preferred solvents are saturated aliphatic hydrocarbons. These may be either paraffinic or naphthenic, i.e. either saturated linear or cyclic hydrocarbons. Examples for preferred hydrocarbons include decane, n-undecane, n-dodecane, tetralin, decalin and their mixtures. Especially preferred are technical solvent mixtures such as Shellsol®, Exxsol®, Isopar®, Solvesso® grades, Solvent Naphtha and/or kerosene. In preferred embodiments, the organic solvent (C) comprises at least 10% by weight, preferably 20 to 100% by weight, and especially preferred 30 to 90% by weight, as for example 10 to 100% by weight, or 20 to 90% by weight, or 30 to 100% by weight of aromatic constituents.

A further group of preferred solvents are saturated aliphatic alcohols having at least eight carbon atoms and esters of saturated aliphatic carboxylic acids and saturated aliphatic alcohols. Examples of suitable alcohols include 1-octanol, 2-ethylhexanol, 1-decanol, 1-dodecanol and iso-tridecanol. Examples of suitable esters include esters of saturated fatty acids having at least eight carbon atoms with saturated aliphatic alcohols, for example methyl laurate or methyl stearate. Technical grade mixtures of different aliphatic esters are commercially available. In a further embodiment of the invention, it is preferred to use esters of aliphatic or cycloaliphatic dicarboxylic acids, for example dialkyl esters of cyclohexane-1,2-dicarboxylic acid such as diisononyl cyclohexane-1,2-dicarboxylate.

The wax inhibitor composition according to the invention can be produced by blending the components (A) and (B) with the solvent (C). Often it has been found to be advantageous to conduct the blending step at elevated temperature, i.e. above the melting point of the polymeric wax inhibitor (B). A temperature of between 30 and 100° C. and especially a temperature between 40 and 65° C. as for example a temperature between 30 and 65° C., or between 40 and 100° C. has proven to be advantageous. It is also within the scope of the invention to formulate the wax inhibitor components (A), (B) and (C) together with further active ingredients for the same or other purposes.

The wax inhibitor composition according to the invention features significantly reduced intrinsic pour point and viscosity over a comparable composition containing the same amount of the wax inhibitor (B) dissolved in the same solvent (C) but not containing (A). Furthermore, the presence of co-additive (A) improves the dissolution of the wax inhibitor composition according to the invention in a paraffin-containing hydrocarbon fluid in comparison to a formulation containing the same amount of the polymeric wax inhibitor (B) dissolved in the same organic solvent (C). This is especially advantageous when treating a paraffin-containing hydrocarbon fluid at lower temperatures Without wishing to be bound by this theory, the improved solubility at lower temperatures is believed to be the result of a reduced crystallinity of the wax inhibitor (B) in the presence of (A). Therefore, in the presence of co-additive (A) the pour point (low temperature flowability limit), the viscosity and the solubility of a wax inhibitor composition containing a polymeric wax inhibitor (B) in a given amount and an organic solvent (C) in balance are significantly improved. Hence, the substitution of organic solvent (C) by co-additive (A) facilitates the handling of a wax inhibitor composition at low storage, transport and application temperatures. This is especially valid when part of the organic solvent (C) in a formulation comprising polymeric wax-inhibitor (B) and organic solvent (C) is substituted by the co-additive (A).

The wax inhibitor composition according to the invention improves the low-temperature properties of paraffin-containing hydrocarbon fluids. It is especially advantageous for the treatment of paraffin-containing mineral oils as for example crude oils and paraffin-containing products produced therefrom, for example residual oils, bunker oils and heavy fuel oils. The term "crude oil" as used herein refers to mineral oils produced at a wellhead and includes for example gas condensates and bitumen. In a preferred embodiment it is used for the treatment of crude oils and residual oils and in an especially preferred embodiment it is used for the treatment of crude oils.

The wax inhibitor composition according to the invention modifies the structure of paraffins that precipitate from paraffin-containing hydrocarbon fluids at low temperatures more effectively than the polymeric wax inhibitor component (B) alone. Accordingly, the presence of a minor amount of co-additive (A) synergistically improves the performance of a polymeric wax inhibitor (B). This leads to a further reduction of the pour point and often also of the viscosity of a paraffin-containing hydrocarbon fluid containing a wax inhibitor (B) in the presence of co-additive (A), compared to the pour point respectively viscosity reduction obtained by the polymeric wax inhibitor (B) alone. Surprisingly it has been found that reaction product (A) is more effective than a comparable reaction product of a fatty acid having a linear alkyl residue with the alkylene polyamine (ii).

The wax inhibitor composition according to the invention may be added to the paraffin-containing hydrocarbon fluid at any point. For example, crude oil may be treated at the wellhead, in a storage vessel or prior to pipeline transport. In some instances, repeated treatment at different points has been proven to be advantageous.

Preferably the amount of wax inhibitor composition added to the paraffin-containing hydrocarbon fluid is between 10 and 20,000 ppm by weight, more preferably between 50 and 10,000 ppm by weight and especially preferred between 100 and 5,000 ppm by weight, as for example between 10 and 10,000 ppm by weight, or between 10 and 5,000 ppm by weight, or between 50 and 20,000 ppm by weight, or between 50 and 5,000 ppm by weight, or between 100 and 20,000 ppm by weight, or between 100 and 10,000 ppm by weight in respect to the amount of paraffin-containing hydrocarbon fluid treated.

EXAMPLES

The reactants used for preparation of the condensation products (A) were of technical grades. The molar amounts of carboxylic acid and amine given in table 1 were calculated from the acid number of the carboxylic acid and the amine number of the amine, both determined by potentiometric titration with a base respectively with an acid. The reaction products were characterized by IR spectroscopy: while an imidazoline shows a strong absorption band at 1605 cm$^{-1}$, the amidoamine shows the absorption band at 1645 cm$^{-1}$. The polymeric wax inhibitors were commercially available products. The molecular weight of EVA copolymers was measured as melt flow index (MFI$_{190}$) according to ISO 1133 at a temperature of 190° C. and with a weight of 2.16 kg applied. Organic solvents used were technical grades.

TABLE 1

| List of components used |
| --- |
| Reaction products of carboxylic acid with alkylene polyamine (A) |

| | |
| --- | --- |
| A1 | Reaction product of naphthenic acid (acid number 225 mg KOH/g) with an equimolar amount of diethylene triamine (DETA), prepared by heating the reactants for 6 hours to 160° C. in Solvent Naphtha. The product was characterized to be an amidoamine. |
| A2 | Reaction product of rosin acid (acid number 174 mg KOH/g) with an equimolar amount of diethylene triamine (DETA); prepared by heating the reactants for 6 hours to 155° C. in Solvent Naphtha. The product was characterized to be an amidoamine. |
| A3 | Reaction product of naphthenic acid (acid number 225 mg KOH/g) with an equimolar amount of triethylene tetramine (TETA), prepared by heating the reactants for 6 hours to 160° C. in Solvent Naphtha. The product was characterized to be an amidoamine. |

TABLE 1-continued

List of components used

| | |
|---|---|
| A4 | Reaction product of equimolar amounts of naphthenic acid (acid number 225 mg KOH/g) and diethylene triamine (DETA), prepared by heating the reactants for 6 hours to 250° C. The obtained product was characterized to be an imidazoline. |
| A5 | Reaction product of rape seed oil with three molar equivalents of diethylene (comp.) triamine, prepared by heating the reactants for 6 hours to 255° C. under vacuum. The obtained product was characterized to contain predominantly imidazoline. |
| A6 (comp.) | Reaction product of rapeseed oil with three equivalents of diethylene triamine (DETA), prepared by heating the reactants for 6 hours to 155° C.C. The obtained was characterized to be an amidoamine. |

Polymeric wax inhibitors (B)

| | |
|---|---|
| B1 | EVA copolymer having a vinyl acetate content of 28 wt.-% and a $MFI_{190}$ of 7 g/10 min, grafted with behenyl acrylate in a weight ratio of 1:3. |
| B2 | EVA copolymer having a vinyl acetate content of 22 wt.-% and a $MFI_{190}$ of 40 g/10 min, grafted with stearyl acrylate in a weight ratio of 1:4. |
| B3 | Copolymer of maleic anhydride with $C_{20/24}$-α-olefin, esterified with behenyl alcohol; having an acid number of 38 mg KOH/g and a mean molecular weight Mw of 10.000 g/mol |
| B4 | Copolymer of maleic anhydride with $C_{20/24}$-α-olefin, esterified with behenyl alcohol; having an acid number of 9 mg KOH/g and a mean molecular weight of 11.500 g/mol |
| B5 | Copolymer of maleic anhydride with $C_{20}$-α-olefin, imidized with stearyl amine; having a mean molecular weight of 8.500 g/mol |
| B6 | EVA copolymer having a vinyl acetate content of 28 wt.-% and a $MFI_{190}$ of 24 g/10 min |
| B7 | Poly(stearylacrylate), Mw 100.000 Dalton, measured per GPC against poly(styrene) standards |

Organic solvents (C)

| | |
|---|---|
| SN | Solvent Naphtha; mixture of aromatic hydrocarbons having carbon numbers predominantly in the range of $C_9$ through $C_{11}$ and boiling in the range of from 177° C. to 216° C. |
| Xyl | xylene, mixture of isomers (technical grade) |

From the components listed in table 1 wax inhibitor compositions were prepared with the proportions given in table 2. The percentages given for components A and B refer to the amounts of active ingredient. The final active content was adjusted with Solvent Naphtha or xylene. The pour point of the compositions was measured according to ASTM D5853 but with pour point readings made in increments of 1° C.

TABLE 2

Wax inhibitor compositions and their pour point

| Composition | A | B | C | Pour Point |
|---|---|---|---|---|
| WI 01 | 4.5% A1 | 30.0% B1 | 65.5% SN | +10° C. |
| WI 02 (comp.) | — | 30.0% B1 | 70.0% SN | +18° C. |
| WI 03 | 10.0% A2 | 20.0% B2 | 70.0% SN | +11° C. |
| WI 04 (comp.) | — | 20.0% B2 | 80.0% SN | +14° C. |
| WI 05 | 4.5% A1 | 33.5% B3 | 62.0% SN | +12° C. |
| WI 06 | 22.0% A1 | 33.5% B3 | 44.5% SN | +7° C. |
| WI 07 (comp.) | — | 33.5% B3 | 66.5% SN | +15° C. |
| WI 08 | 2.2% A1 | 36.7% B1 | 61.1% Xyl | +16° C. |
| WI 09 | 4.5% A1 | 36.7% B1 | 58.8% Xyl | +14° C. |
| WI 10 (comp.) | — | 36.7% B1 | 63.3% Xyl | +21° C. |
| WI 11 | 4.5% A1 | 20.0% B3 | 75.5% SN | −3° C. |
| WI 12 (comp.) | — | 20.0% B3 | 80.0% SN | +10° C. |
| WI 13 (comp.) | 4.5% A5 | 20.0% B3 | 75.5% SN | +2° C. |
| WI 14 (comp.) | 4.5% A6 | 20.0% B3 | 75.5% SN | +6° C. |
| WI 15 | 4.4% A1 | 18.3% B5 | 77.3% SN | −10° C. |
| WI 16 (comp.) | — | 18.3% B5 | 81.7% SN | −8° C. |
| WI 17 (comp.) | 4.4% A5 | 18.3% B5 | 77.3% SN | −8° C. |
| WI 18 | 4.5% A1 | 23.5% B3 8.3% B5 | 68.2% SN | 6° C. |
| WI 19 (comp.) | — | 23.5% B3 8.3% B5 | 72.7% SN | 13° C. |
| WI 20 | 4.0% A2 | 4.5% B6 | 93.4% SN | −12° C. |
| WI 21 (comp.) | — | 4.5% B6 | 97.8% SN | −9° C. |
| WI 22 | 9.0% A3 | 20.0% B7 | 71.0% Xyl | +5° C. |
| WI 23 (comp.) | — | 20.0% B7 | 80.0% Xyl | +7° C. |
| WI 24 | 4.5% A4 | 40.0% B1 16.5% B7 | 39.0% Xyl | +16° C. |
| WI 25 (comp.) | — | 40.0% B1 16.5% B7 | 43.5% Xyl | +21° C. |
| WI 26 (comp.) | 4.5% A6 | 40.0% B1 16.5% B7 | 43.5% Xyl | +18° C. |

The viscosity of the compositions was measured according to DIN 53019 (Brookfield) with a Haake Rheo Stress 600 in a Z40DIN Ti beaker having a volume of 70 ml, applying a shear rate of 10 s$^{-1}$ and a cooling rate of 0.5° C./min. Table 3 gives the temperature at which the sample exceeds a viscosity of 1.000 mPas during this cooling protocol. For comparison, some additional viscosity values are listed in the table.

TABLE 3

Viscosity of wax inhibitors compositions at different temperatures

| example | wax inhibitor composition | viscosity | temperature |
|---|---|---|---|
| 1 | WI 03 | 1,000 mPas | +8° C. |
| 2 (comp.) | WI 04 (comp.) | 1,000 mPas | +11° C. |
| 3 | WI 11 | 1,000 mPas | −4° C. |
| 4 | WI 11 | 20 mPas | +4° C. |
| 5 (comp.) | WI 12 (comp.) | 1,000 mPas | +4° C. |
| 6 | WI 20 | 1,000 mPas | −6° C. |

TABLE 3-continued

Viscosity of wax inhibitors compositions at different temperatures

| example | wax inhibitor composition | viscosity | temperature |
|---|---|---|---|
| 7 (comp.) | WI 21 (comp.) | 1,000 mPas | −7° C. |
| 8 | WI 15 | 40 mPas | −7° C. |
| 9 | WI 15 | 1,000 mPas | <−15° C. |
| 10 (comp.) | WI 16 (comp.) | 1,000 mPas | −7° C. |
| 11 (comp.) | WI 17 (comp.) | 1,000 mPas | −9° C. |
| 12 | WI 18 | 1,000 m Pas | +8° C. |
| 13 (comp.) | WI 19 (comp.) | 1,000 m Pas | +4° C. |
| 14 | WI 20 | 1,000 m Pas | −6° C. |
| 15 (comp.) | WI 21 (comp.) | 1,000 m Pas | −7° C. |
| 16 | WI 22 | 1,000 m Pas | +3° C. |
| 17 (comp.) | WI 23 (comp.) | 1,000 m Pas | +5° C. |

The pour point reduction of wax inhibitor compositions according to table 2 in hydrocarbon fluids was tested in two crude oils. The characterization of the crude oils according to the SARA analysis according to IP 469 is given in table 4; the pour point results measured upon additivation of these oils with wax inhibitor compositions according to table 2 are given in tables 5 and 6. For comparison, A3 was tested upon dilution with xylene as a 9 wt.-% active solution.

TABLE 4

Characterization of crude oils

| | crude oil A | crude oil B |
|---|---|---|
| S(aturates) | 56% | 71% |
| A(romatics) | 22% | 15% |
| R(esins) | 7% | 4% |
| A(spalthenes) | 15% | 10% |
| Pour Point | 27° C. | 27° C. |

TABLE 5

Pour point reduction in crude oil 1

| Example | wax inhibitor composition | dosage rate | pour point |
|---|---|---|---|
| 18 | none | 0 | 27° C. |
| 19 | WI 01 | 1,000 ppm | 9° C. |
| 20 (comp.) | WI 02 (comp.) | 1,000 ppm | 12° C. |
| 21 (comp.) | A1 | 100 ppm | 27° C. |
| 22 | WI 20 | 1,200 ppm | 6° C. |
| 23 (comp.) | WI 21 (comp.) | 1,200 ppm | 12° C. |
| 24 | WI 24 | 1,000 ppm | 6° C. |
| 25 (comp.) | WI 25 | 1,000 ppm | 9° C. |
| 26 (comp.) | WI 26 | 1,000 ppm | 12° C. |

TABLE 6

Pour point reduction in crude oil 2

| Example | wax inhibitor composition | dosage rate | pour point |
|---|---|---|---|
| 27 | none | 0 | 27° C. |
| 28 | WI 01 | 1,000 ppm | 11° C. |
| 29 (comp.) | WI 02 (comp.) | 1,000 ppm | 12° C. |
| 30 | WI 22 | 1,200 ppm | 12° C. |
| 31 (comp.) | WI 23 (comp.) | 1,200 ppm | 15° C. |
| 32 (comp.) | A3 (9% in Xyl) | 1,200 ppm | 27° C. |

Far assessment at solubility on the wax inhibitor composition (additive) in a hydrocarbon fluid 5.000 ppm at a composition according ta table 2 was doped via a syringe into 100 ml at diesel in a cylindrical beaker with a height of 20 cm. The dissolution behavior was rated visually according ta the grading given in table 7. The results obtained with different wax inhibitors according ta table 2 are given in table 8.

TABLE 7

Rating of dissolving behavior

| grading | visual observation |
|---|---|
| 1 | the additive dissolves on its way down the liquid but it does not reach the bottom of the cylinder. |
| 2 | part of the additive sinks to the bottom of the cylinder and dissolves upon gentle shaking. |
| 3 | the additive sinks to the bottom of the cylinder and requires shaking to dissolve. |

TABLE 8

Dissolution behavior of wax inhibitor compositions

| example | wax inhibitor composition | temperature | grading |
|---|---|---|---|
| 33 | WI 01 | 22° C. | 1 |
| 34 (comp.) | WI 02 (comp.) | 22° C. | 3 |
| 35 | WI 03 | 22° C. | 1 |
| 36 (comp.) | WI 04 (comp.) | 22° C. | 3 |
| 37 | WI 06 | 20° C. | 1 |
| 38 (comp.) | WI 07 (comp.) | 20° C. | 3 |
| 39 | WI 24 | 25° C. | 1 |
| 40 (comp.) | WI25 (comp.) | 25° C. | 2 |

The invention claimed is:

1. A wax inhibitor composition comprising
   A) a reaction product prepared by the reaction of
      i) a carboxylic acid containing a cycloaliphatic hydrocarbyl residue, the cycloaliphatic hydrocarbyl residue being optionally-substituted, and
      ii) an alkylene polyamine,
   B) a polymeric wax inhibitor, and
   C) an organic solvent.

2. The wax inhibitor composition according to claim 1, wherein the reaction product of the carboxylic acid containing a cycloaliphatic hydrocarbyl residue (i) and the alkylene polyamine (ii) is an amidoamine of the general formula (1)

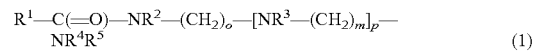

$$R^1-C(=O)-NR^2-(CH_2)_o-[NR^3-(CH_2)_m]_p-NR^4R^5 \qquad (1)$$

wherein
R$^1$ is a hydrocarbyl residue having 5 to 70 carbon atoms and containing at least one cycloaliphatic hydrocarbyl structural unit, the hydrocarbyl residue being optionally-substituted,
R$^2$, R$^3$ are, independently from each other, selected from the group consisting of hydrogen and a hydrocarbyl residue having 1 to 20 carbon atoms,
R$^4$ is hydrogen, or a hydrocarbyl residue having 1 to 20 carbon atoms,
R$^5$ is, independently from R$^4$, selected from the group consisting of hydrogen, an acyl group having the structure —C(=O)—R$^1$, and a hydrocarbyl residue having 1 to 20 carbon atoms, wherein the hydrocarbyl residue is optionally substituted, with the proviso that $R^4$ and $R^5$ together may form a 5- or 6-membered ring, is an integer from 2 to 5, m is an integer from 2 to 5, and p is 0 or an integer from 1 to 10.

3. The wax inhibitor composition according to claim 1, wherein the reaction product of the carboxylic acid containing a cycloaliphatic hydrocarbyl residue (i) and the alkylene polyamine (ii) is an imidazoline of the general formula (2):

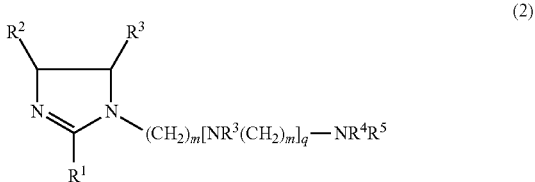

(2)

wherein $R^1$ is a hydrocarbyl residue having 5 to 70 carbon atoms and containing at least one cycloaliphatic hydrocarbyl structural unit, the hydrocarbyl residue being optionally-substituted, $R^2$, $R^3$ are, independently from each other, selected from the group consisting of hydrogen and a hydrocarbyl residue having 1 to 20 carbon atoms, $R^4$ is hydrogen, or a hydrocarbyl residue having 1 to 20 carbon atoms, $R^5$ is, independently from $R^4$, selected from the group consisting of hydrogen, an acyl group having the structure —C(=O)—$R^1$, and a hydrocarbyl residue having 1 to 20 carbon atoms, wherein the hydrocarbyl residue is optionally substituted, with the proviso that $R^4$ and $R^5$ together may form a 5- or 6-membered ring, m is an integer from 2 to 5, and q is 0 or an integer between 1 and 9.

4. The wax inhibitor composition according to claim 1, wherein the reaction product of the carboxylic acid containing a cycloaliphatic hydrocarbyl residue (i) and the alkylene polyamine (ii) contains an amidoamine of the general formula (1) and an imidazoline of the general formula (2).

5. The wax inhibitor composition according to claim 4, wherein the ratio of the amidoamine of the general formula (1) to the imidazoline of the general formula (2) is between 50:1 and 1:20.

6. The wax inhibitor composition according to claim 1, wherein the carboxylic acid containing a cycloaliphatic hydrocarbyl residue (i) has from 7 to 70 carbon atoms.

7. The wax inhibitor composition according to claim 1, wherein the carboxylic acid containing a cycloaliphatic hydrocarbyl residue (i) used for the preparation of the reaction product (A) is a naphthenic acid.

8. The wax inhibitor composition according to claim 1, wherein the carboxylic acid containing a cycloaliphatic hydrocarbyl residue (i) used for the preparation of the reaction product (A) is a resin acid.

9. The wax inhibitor composition according to claim 1, wherein an admixture of a major amount of the carboxylic acid containing a cycloaliphatic hydrocarbyl residue (i) and a minor amount of a linear carboxylic acid is reacted with the alkylene polyamine (ii) to give the reaction product (A).

10. The wax inhibitor composition according to claim 1, wherein the alkylene polyamine (ii) has from 2 to 20 carbon atoms.

11. The wax inhibitor composition according to claim 1, wherein the alkylene polyamine (ii) contains from 2 to 10 nitrogen atoms.

12. The wax inhibitor composition according to claim 1, wherein the polymeric wax inhibitor (B) is selected from the group consisting of a) copolymers of ethylene with ethylenically unsaturated esters, ethers, $C_3$- to $C_{30}$-alkenes, or with combinations of these;

b) homo- or copolymers of ethylenically unsaturated carboxylic acids, bearing $C_{12}$-$C_{50}$-alkyl radicals bound via ester, amide, or imide groups, or via combinations of these;

c) ethylene copolymers grafted with ethylenically unsaturated esters, ethers, or both; and d) condensation products of alkyl substituted phenols with aldehydes or ketones.

13. The wax inhibitor composition according to claim 1, wherein the polymeric wax inhibitor (B) is a mixture of two or more different polymeric wax inhibitors.

14. The wax inhibitor composition according to claim 1, wherein the portion of reaction product (A) is between 1 and 50% by weight based on the combined masses of (A) and (B).

15. The wax inhibitor composition according to claim 1, wherein the portion of reaction product (A) is between 1 and 20% by weight based on the combined masses of (A) and (B).

16. The wax inhibitor composition according to claim 1, wherein the portion of polymeric wax inhibitor (B) is between 50 and 99% by weight based on the combined mass of (A) and (B).

17. The wax inhibitor composition according to claim 1, wherein the organic solvent (C) comprises a hydrocarbon or a hydrocarbon mixture.

18. The wax inhibitor composition according to claim 1, wherein the organic solvent (C) is an aliphatic hydrocarbon, a cycloaliphatic hydrocarbon, an aromatic hydrocarbon, an alkyl aromatic hydrocarbon, or a mixture thereof.

19. The wax inhibitor composition according to claim 1, wherein the organic solvent (C) has a flashpoint above 60° C.

20. The wax inhibitor composition according to claim 1, wherein the cycloaliphatic hydrocarbyl residue is substituted with one or more alkyl groups having 1 to 10 carbon atoms, alkenyl groups having 2 to 10 carbon atoms, hydroxyl groups, alkoxyl groups, halogens, or combinations of these.

21. A method to reduce the viscosity of a polymeric wax inhibitor (B) comprising the mixing of the polymeric wax inhibitor (B) with a reaction product (A) obtainable by the reaction of a carboxylic acid containing a cycloaliphatic hydrocarbyl residue (i) with an alkylene polyamine (ii), wherein (A) and (B) are dissolved or dispersed in an organic solvent (C).

22. A method for improving the cold flow properties of a paraffin-containing hydrocarbon fluid wherein the method comprises admixing the paraffin-containing hydrocarbon fluid with a wax inhibitor composition, wherein the wax inhibitor composition comprises A) a reaction product prepared by the reaction of i) a carboxylic acid containing a cycloaliphatic hydrocarbyl residue, the cycloaliphatic hydrocarbyl residue being optionally-substituted, and ii) an alkylene polyamine, B) a polymeric wax inhibitor, and
C) an organic solvent.

23. The method according to claim 22, wherein the paraffin-containing hydrocarbon fluid is a crude oil, residual oil, bunker oil or a heavy fuel oil.

24. The method according to claim 22, wherein the wax inhibitor composition acts as a pour point depressant.

25. The method according to claim 22, wherein the amount of the wax inhibitor composition added to the paraffin-containing hydrocarbon fluid is between 50 and 3000 ppm based on the paraffin-containing hydrocarbon fluid.

26. The method according to claim 22, wherein the wax inhibitor composition is injected into a crude oil pipeline.

27. The method according to claim 22, wherein the wax inhibitor composition is injected into a production well.

28. A composition comprising a paraffin-containing hydrocarbon fluid and a wax inhibitor composition, wherein the wax inhibitor composition comprises
   A) a reaction product prepared by the reaction of
      i) a carboxylic acid containing a cycloaliphatic hydrocarbyl residue, the cycloaliphatic hydrocarbyl residue being optionally-substituted, and
      ii) an alkylene polyamine,
   B) a polymeric wax inhibitor, and
   C) an organic solvent.

29. The composition according to claim 28, wherein the paraffin-containing hydrocarbon fluid is crude oil, residual oil, bunker oil or heavy fuel oil.

* * * * *